United States Patent
Jung et al.

(10) Patent No.: US 9,946,129 B2
(45) Date of Patent: *Apr. 17, 2018

(54) LIQUID CRYSTAL DISPLAY

(71) Applicant: Samsung Display Co., Ltd., Yongin (KR)

(72) Inventors: Hyung Gi Jung, Cheonan-si (KR); Swae-Hyun Kim, Asan-si (KR); Yeo Geon Yoon, Suwon-si (KR); Sung Hee Hong, Hwaseong-si (KR); Hyung June Kim, Anyang-si (KR); Jae Hwa Park, Gumi-si (KR); Young Goo Song, Asan-si (KR); Sung Hoon Kim, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,675

(22) Filed: Dec. 4, 2015

(65) Prior Publication Data

US 2016/0085123 A1 Mar. 24, 2016

Related U.S. Application Data

(63) Continuation of application No. 13/839,095, filed on Mar. 15, 2013, now Pat. No. 9,207,506.

(30) Foreign Application Priority Data

Oct. 5, 2012 (KR) .................. 10-2012-0110866

(51) Int. Cl.
*G02F 1/1362* (2006.01)
*G02F 1/1343* (2006.01)
(Continued)

(52) U.S. Cl.
CPC ...... *G02F 1/136209* (2013.01); *G02F 1/1368* (2013.01); *G02F 1/133512* (2013.01);
(Continued)

(58) Field of Classification Search
CPC ............. G02F 1/1368; G02F 1/136209; G02F 1/133512; G02F 1/13394
See application file for complete search history.

(56) References Cited

U.S. PATENT DOCUMENTS 7,345,727 B2 3/2008 Kim et al.
8,081,286 B2 12/2011 Kim et al.
(Continued)

FOREIGN PATENT DOCUMENTS

JP 09005792 A 1/1997
JP 09015629 A 1/1997
(Continued)

OTHER PUBLICATIONS

Extended Europena Search Report for Application No. 13167554.8-1904 dated Dec. 19, 2013.

*Primary Examiner* — Dung Nguyen
(74) *Attorney, Agent, or Firm* — Cantor Colburn LLP

(57) ABSTRACT

A liquid crystal display includes: a first insulation substrate; a gate line disposed on the first insulation substrate; a first data line and a second data line disposed on the first insulation substrate; a color filter disposed on the first insulation substrate and disposed between the first data line and the second data line; a first light blocking member disposed on the first data line and the second data line; and a second light blocking member disposed on the color filter and the first light blocking member, extending in the same direction as the gate line, and overlapping the first light blocking member on the first data line and the second data line.

17 Claims, 39 Drawing Sheets

(51) Int. Cl.
*G02F 1/1335* (2006.01)
*G02F 1/1368* (2006.01)
*G02F 1/1337* (2006.01)
*G02F 1/1339* (2006.01)
*G02F 1/1333* (2006.01)

(52) U.S. Cl.
CPC .... *G02F 1/134309* (2013.01); *G02F 1/13394* (2013.01); *G02F 1/133345* (2013.01); *G02F 1/133753* (2013.01); *G02F 1/134363* (2013.01); *G02F 2001/134345* (2013.01); *G02F 2001/136222* (2013.01); *G02F 2001/136268* (2013.01)

(56) References Cited

U.S. PATENT DOCUMENTS

| | | | |
|---|---|---|---|
| 8,094,254 | B2 | 1/2012 | Yamazaki et al. |
| 8,390,753 | B2 | 3/2013 | Choi |
| 9,207,506 | B2 * | 12/2015 | Jung ................ G02F 1/136209 |
| 2002/0085149 | A1 | 7/2002 | Kim et al. |
| 2004/0169797 | A1 | 9/2004 | Fujita et al. |
| 2007/0070279 | A1 | 3/2007 | Sugiyama et al. |
| 2010/0007811 | A1 | 1/2010 | Choi |
| 2011/0051057 | A1 | 3/2011 | Song et al. |
| 2011/0085103 | A1 | 4/2011 | Yang et al. |
| 2011/0180798 | A1 * | 7/2011 | Shim ................. G02F 1/133512 257/59 |
| 2011/0216276 | A1 | 9/2011 | Yang et al. |
| 2014/0098315 | A1 * | 4/2014 | Jung ..................... G02F 1/1368 349/42 |

FOREIGN PATENT DOCUMENTS

| | | |
|---|---|---|
| JP | 11212075 A | 8/1999 |
| JP | 2007199181 A | 8/2007 |
| JP | 2008181099 A | 8/2008 |
| JP | 2010128248 A | 6/2010 |
| JP | 2010128495 A | 6/2010 |
| JP | 4725170 B2 | 4/2011 |
| JP | 2011186476 | 9/2011 |
| KR | 1020040060592 A | 7/2004 |
| KR | 100625027 B1 | 9/2006 |
| KR | 1020070046239 A | 5/2007 |
| KR | 1020070077998 A | 7/2007 |
| KR | 1020070105457 A | 10/2007 |
| KR | 1020080003075 A | 1/2008 |
| KR | 1020080003108 A | 1/2008 |
| KR | 1020080019385 A | 3/2008 |
| KR | 1020080034545 A | 4/2008 |
| KR | 1020080039012 A | 5/2008 |
| KR | 100951840 B1 | 4/2010 |
| KR | 1020110086937 A | 8/2011 |

* cited by examiner

LIQUID CRYSTAL DISPLAY

This application is a continuation of U.S. patent application Ser. No. 13/839,095, filed on Mar. 15, 2013, which claims priority to Korean Patent Application No. 10-2012-0110866, filed on Oct. 5, 2012, and all the benefits accruing therefrom under 35 U.S.C. § 119, the content of which in its entirety is herein incorporated by reference.

BACKGROUND (a) Field

Exemplary embodiments of the invention relate to a liquid crystal display.

(b) Description of the Related Art

A liquid crystal display, which is one of the most widely used types of flat panel displays, includes two sheets of display panels with field generating electrodes such as a pixel electrode and a common electrode and a liquid crystal layer interposed therebetween. The liquid crystal display generates an electric field in the liquid crystal layer by applying voltage to the field generating electrodes, and determines the direction of liquid crystal molecules of the liquid crystal layer by the generated electric field, thus controlling polarization of incident light to display images.

Among the liquid crystal displays, a vertically aligned mode liquid crystal display has been in the limelight, as the vertically aligned mode liquid crystal display including liquid crystal molecules, longitudinal axes of which are arranged substantially vertical to the display panel when the electric field is not applied, typically has a large contrast ratio and easily implements a wide reference viewing angle.

In the vertically aligned mode liquid crystal display, a plurality of domains having different alignment directions of the liquid crystal may be disposed in one pixel to implement a wide viewing angle.

In the vertically aligned mode liquid crystal display, a method of forming cutouts such as minute slits at the field generating electrode or a method of forming protrusions on the field generating electrode is used to provide the domains. The method may be used to provide the domains by aligning the liquid crystal in a vertical direction to a fringe field by the fringe field generated between the cutout or an edge of the protrusion and the field generating electrode opposed thereto.

In the liquid crystal display, a light blocking member is disposed at a position where a thin film transistor or the like is disposed to effectively prevent leakage current of a channel layer due to light. Further, when both a color filter and the light blocking member are disposed on a thin film transistor array panel, light leakage due to arrangement error of two display panels, which may occur in the case where the color filter and the light blocking member are disposed on a common electrode display panel, may be effectively prevented.

In the liquid crystal display, in the case where the light blocking member is provided on the thin film transistor array panel, the light blocking member may not be provided on the channel part of the thin film transistor so as to efficiently repair a defect of the thin film transistor during the manufacturing process thereof, and a colored member is typically provided to cover the channel part of the thin film transistor after repairing the thin film transistor.

SUMMARY

Exemplary embodiments of the invention relate to a liquid crystal display, in which light leakage due to an arrangement error is effectively prevented by providing a color filter and a light blocking member on a thin film transistor array panel, a performance characteristic of a thin film transistor is effectively prevented from deteriorating by additional thin film, which is provided to compensate a step of the light blocking member, and the thin film transistor is efficiently repaired during a manufacturing process thereof.

An exemplary embodiment of the invention provides a liquid crystal display including: a first insulation substrate; a gate line disposed on the first insulation substrate; a first data line and a second data line disposed on the first insulation substrate; a color filter disposed on the first insulation substrate and disposed between the first data line and the second data line; a first light blocking member disposed on the first data line and the second data line; and a second light blocking member disposed on the color filter and the first light blocking member, extending in the same direction as the gate line, and overlapping the first light blocking member on the first data line and the second data line.

In an exemplary embodiment, a width of the first light blocking member may be substantially constant.

In an exemplary embodiment, the second light blocking member may include a first portion, a second portion, and a third portion, and thicknesses of the first, second and third portions are different from each other.

In an exemplary embodiment, the liquid crystal display may further include a pixel electrode disposed on the color filter and including a first subpixel electrode and a second subpixel electrode separated from each other with the gate line, which is disposed between the first and second subpixel electrodes; a first thin film transistor connected to the first subpixel electrode; and a second thin film transistor connected to the second subpixel electrode, in which the second light blocking member may extend along the gate line and cover the first thin film transistor and the second thin film transistor.

In an exemplary embodiment, each of the first subpixel electrode and the second subpixel electrode may include a plurality of stems and a plurality of branch electrodes protruding from the stems.

In an exemplary embodiment, the second light blocking member may include a first portion and a second portion, and thicknesses of the first and second portion may be different from each other.

In an exemplary embodiment, the first portion may contact a surface of a thin film which is disposed on a second insulation substrate disposed opposite to the first insulation substrate.

In an exemplary embodiment, the second portion may include a first region at which the second portion overlaps the first light blocking member and a second region which is a remaining region thereof, and a distance between the first region and the surface of the thin film disposed on the second insulation substrate may be less than a distance between the second region and the surface of the thin film disposed on the second insulation substrate.

In an exemplary embodiment, a width of the first light blocking member at an overlapping portion of the first light blocking member and the second light blocking member may be less than a width of the remaining portion of the first light blocking member.

In an exemplary embodiment, a width of the first light blocking member may be about 0.7 micrometer (μm) at an overlapping portion of the first light blocking member and the second light blocking member.

In an exemplary embodiment, a thickness of the first light blocking member may be decreased as being closer to a center of the second light blocking member from the overlapping portion of the first light blocking member and the second light blocking member.

In an exemplary embodiment, the thickness of the first light blocking member may be about 0 μm at the center of the second light blocking member.

In an exemplary embodiment, the liquid crystal display may further include a color filter disposed between two adjacent data lines, a first light blocking member disposed on the data lines, and a second light blocking member disposed on the color filter in a region where the thin film transistor is disposed, in which the first light blocking member and the second light blocking member may be overlapping at least a portion of each other.

According to exemplary embodiments of the invention, light leakage in the region adjacent to the data line and the gate line is effectively prevented while the light leakage due to the arrangement error is effectively prevented by the color filter and the light blocking member disposed on the thin film transistor array panel. In such embodiments, a performance characteristic of the thin film transistor is effectively prevented from deteriorating due to formation of a thin film due to the step of the first light blocking member by the color filter disposed on the thin film transistor without providing the first light blocking member on the thin film transistor for efficiently repair of the thin film transistor.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
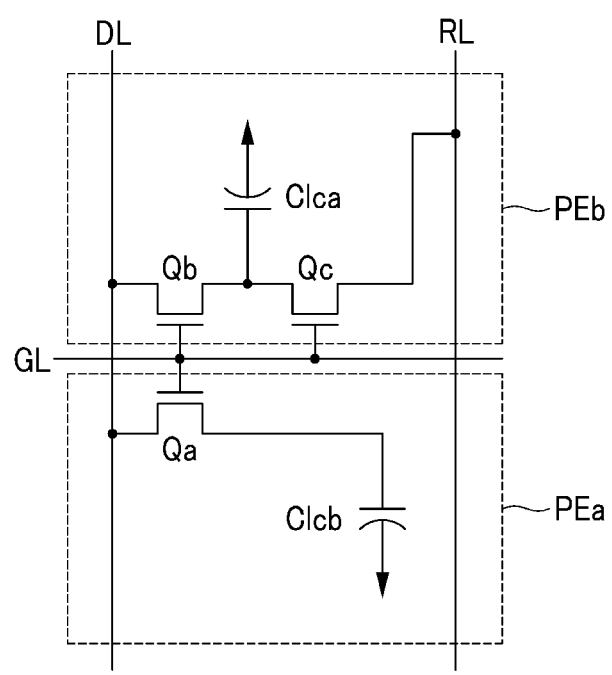
FIG. 1 is an equivalent circuit diagram of a pixel of an exemplary embodiment of a liquid crystal display according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

First, a layout of signal lines and a pixel of an exemplary embodiment of a liquid crystal display according to the invention and a driving method thereof will be described with reference to FIG. 1. FIG. 1 is an equivalent circuit diagram of a pixel of an exemplary embodiment of a liquid crystal display according to the invention.

Referring to FIG. 1, in an exemplary embodiment, a pixel PX, e.g., a single pixel, of the liquid crystal display includes a plurality of signal lines including a gate line GL that transfers a gate signal, a data line DL that transfers a data signal, and a divided reference voltage line RL that transfers divided reference voltage, and first, second and third switching elements Qa, Qb and Qc and first and second liquid crystal capacitors Clca and Clcb, which are connected to the signal lines.

The first and the second switching elements Qa and Qb are connected to the gate line GL and the data line DL, and the third switching element Qc is connected to an output terminal of the second switching element Qb and the divided reference voltage line RL.

In an exemplary embodiment, the first switching element Qa and the second switching element Qb are three-terminal elements such as a thin film transistor, control terminals thereof are connected to the gate line GL, and input terminals thereof are connected to the data line DL. In such an embodiment, an output terminal of the first switching element Qa is connected to the first liquid crystal capacitor Clca, and an output terminal of the second switching element Qb is connected to an input terminal of the second liquid crystal capacitor Clcb and the third switching element Qc.

In such an embodiment, the third switching element Qc is a three-terminal element such as a thin film transistor, a control terminal thereof is connected to the gate line GL, an input terminal thereof is connected to the second liquid crystal capacitor Clcb, and an output terminal thereof is connected to the divided reference voltage line RL.

When a gate on signal is applied to the gate line GL, the first switching element Qa, the second switching element Qb and the third switching element Qc connected thereto are turned on. Accordingly, data voltage applied to the data line DL is applied to a first subpixel electrode PEa and a second subpixel electrode PEb through the turned-on first switching element Qa and second switching element Qb. In such an embodiment, the data voltages applied to the first subpixel electrode PEa and the second subpixel electrode PEb are substantially the same as each other, and the first liquid crystal capacitor Clca and the second liquid crystal capacitor Clcb are charged to substantially the same value by a difference between a common voltage and the data voltage. Simultaneously, the voltage charged in the second liquid crystal capacitor Clcb is divided through the turned-on third switching element Qc. As a result, a voltage value charged in the second liquid crystal capacitor Clcb is lowered by a difference between the common voltage and the divided reference voltage. In such an embodiment, the voltage charged in the first liquid crystal capacitor Clca is greater than the voltage charged in the second liquid crystal capacitor Clcb.

In such an embodiment, as described above, the voltage charged in the first liquid crystal capacitor Clca and the voltage charged in the second liquid crystal capacitor Clcb are different from each other. In such an embodiment, where the voltage of the first liquid crystal capacitor Clca and the voltage of the second liquid crystal capacitor Clcb are different from each other, inclined angles of liquid crystal molecules are different from each other in the first subpixel and the second subpixel, such that luminance of the two subpixels varies. Accordingly, in such an embodiment, an image viewed from a side may be substantially close to an image viewed from a front by controlling the voltage of the first liquid crystal capacitor Clca and the voltage of the second liquid crystal capacitor Clcb, thereby substantially improving side visibility.

In an exemplary embodiment, as shown in FIG. 1, the third switching element Qc connected to the second liquid crystal capacitor Clcb and the divided reference voltage line RL is included to differentiate the voltage charged in the first liquid crystal capacitor Clca and the voltage charged in the second liquid crystal capacitor Clcb, but not being limited thereto. In an alternative exemplary embodiment of a liquid crystal display according to the invention, the second liquid crystal capacitor Clcb may be connected to a step-down capacitor. In such an embodiment, the third switching element including a first terminal connected to a step-down gate line, a second terminal connected to the second liquid crystal capacitor Clcb and a third terminal connected to the step-down capacitor is included to charge a portion of charges charged in the second liquid crystal capacitor Clcb in the step-down capacitor, such that the charged voltages between the first liquid crystal capacitor Clcb and the second liquid crystal capacitor Clcb may be differently set. In another alternative exemplary embodiment of the liquid crystal display according to the invention, the first liquid crystal capacitor Clcb and the second liquid crystal capacitor Clcb are connected to different data lines, respectively, to receive different data voltages, and as a result, the charged voltages between the first liquid crystal capacitor Clcb and the second liquid crystal capacitor Clcb may be differently set. In an exemplary embodiment, the charged voltages between the first liquid crystal capacitor Clcb and the second liquid crystal capacitor Clcb may be differently set using various methods.

Figure 2:
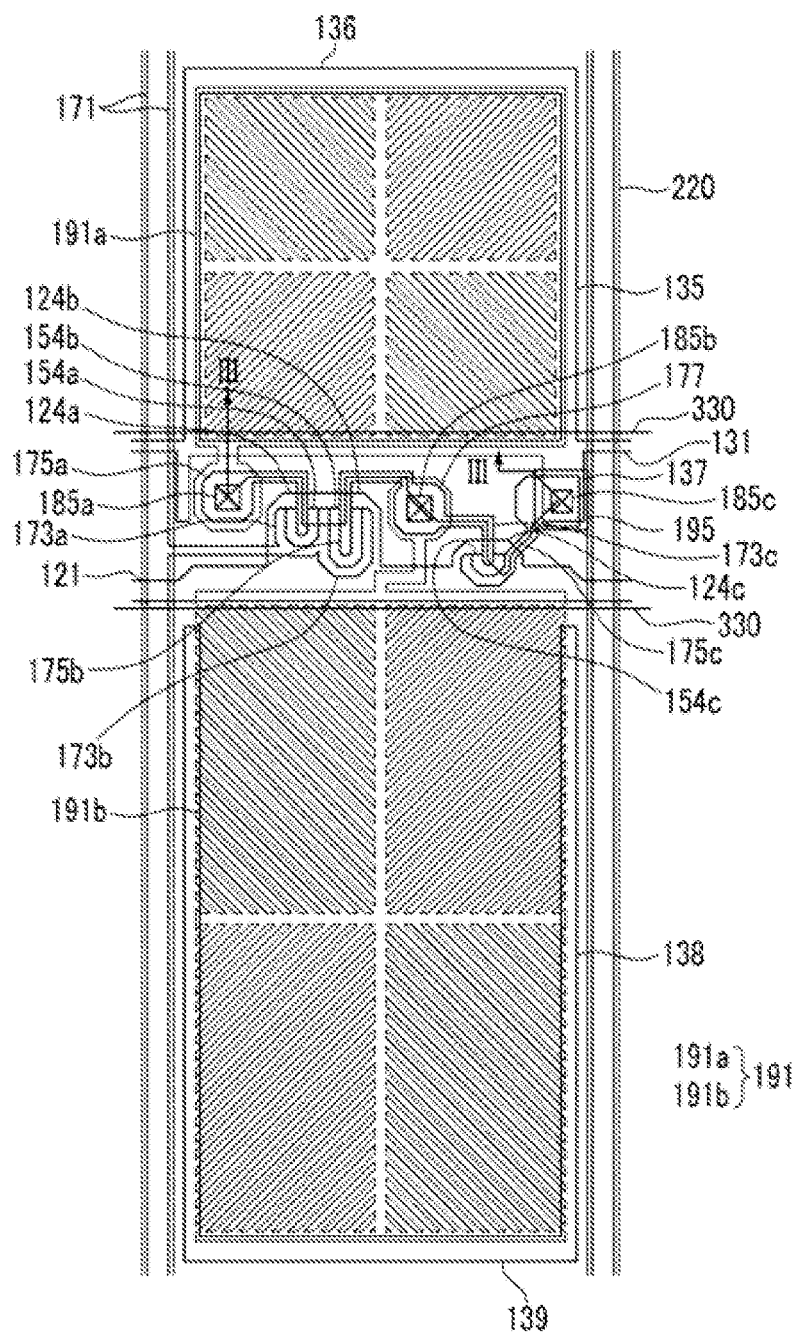
FIG. 2 is a top plan view of a pixel of an exemplary embodiment of the liquid crystal display according to the invention.
Figure 3:
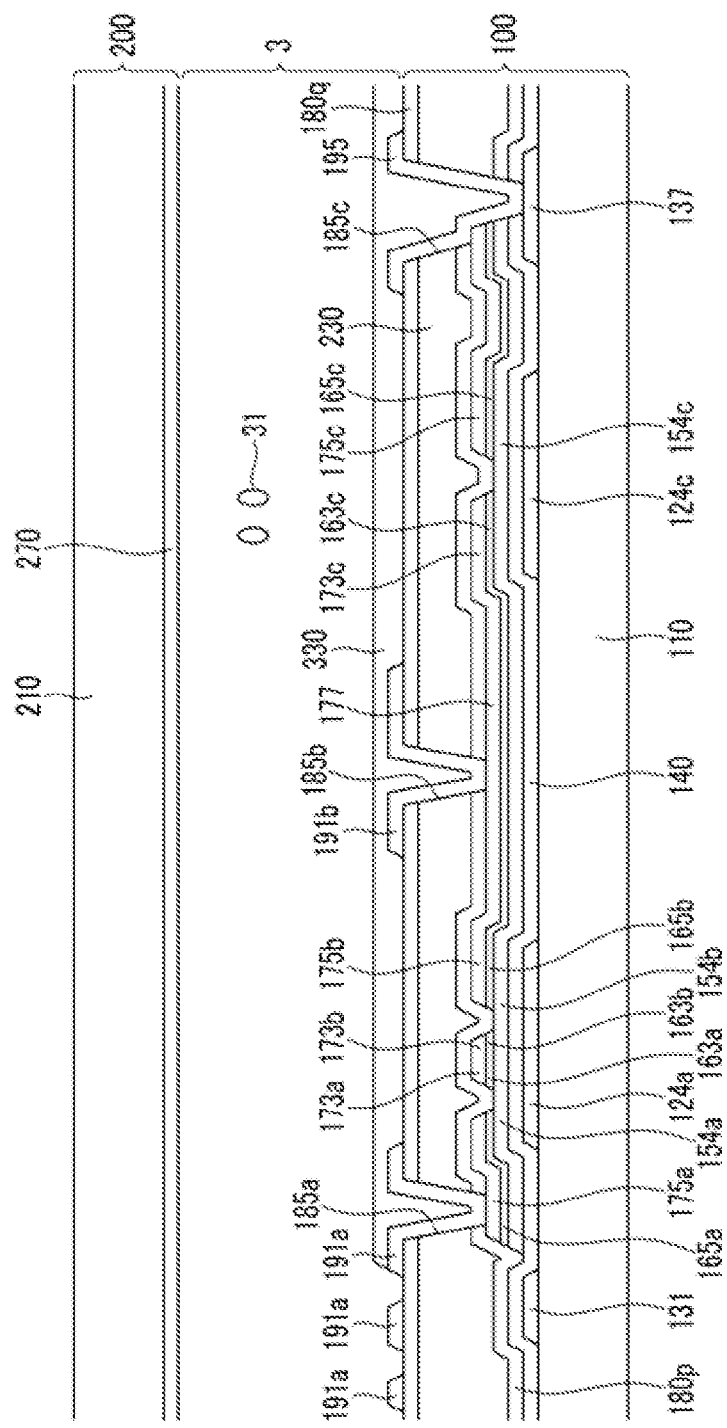
FIG. 3 is a cross-sectional view taken along line III-III of the liquid crystal display of FIG. 2.
Figure 4:
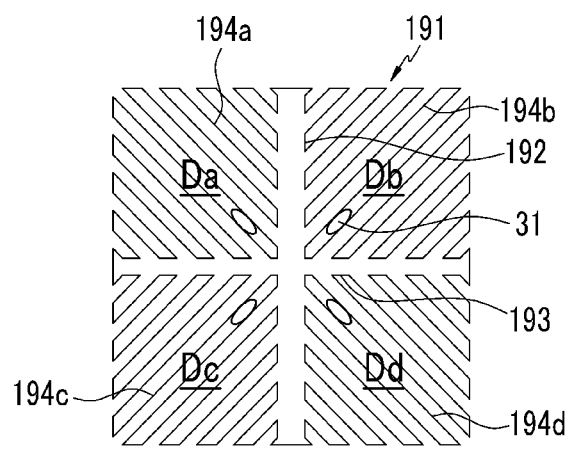
FIG. 4 is a plan view of a unit region of a pixel electrode of an exemplary embodiment of the liquid crystal display according to the invention.
Figure 5:
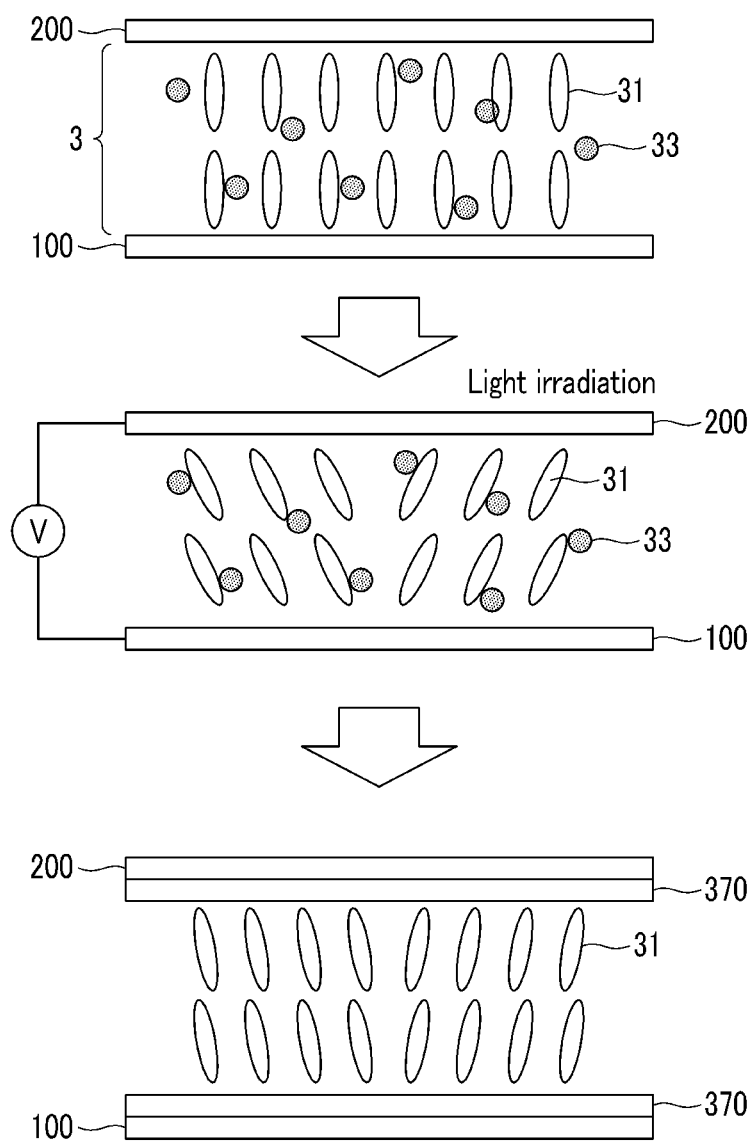
FIG. 5 is a diagram illustrating a process in which liquid crystal molecules have pretilts using a prepolymer polymerized by light such as ultraviolet light.

Now, a structure of an exemplary embodiment of the liquid crystal display will be simply described with reference to FIGS. 2 to 5. FIG. 2 is a top plan view of a pixel of an exemplary embodiment of the liquid crystal display according to the invention, and FIG. 3 is a cross-sectional view taken along line III-III of the liquid crystal display of FIG. 2. FIG. 4 is a plan view of a unit region of a pixel electrode of an exemplary embodiment of the liquid crystal display according to the invention, and FIG. 5 is a diagram illustrating a process in which liquid crystal molecules have pretilts using a prepolymer polymerized by light such as ultraviolet light.

Referring to FIGS. 2 and 3, the liquid crystal display includes a lower panel 100 and an upper panel 200 disposed opposite to, e.g., facing, each other, a liquid crystal layer 3 interposed between the lower and upper panels 100 and 200, and a pair of polarizers (not illustrated) disposed on, e.g., attached to, outer surfaces of the lower and upper panels 100 and 200.

First, the lower panel 100 will be described.

The lower panel 100 includes a first insulation substrate 110 including transparent glass, plastic, or the like. A gate conductor including a gate line 121 and a divided reference voltage line 131 is disposed on the first insulation substrate 110.

The gate line 121 includes a wide end portion (not illustrated) for connection with a first gate electrode 124a, a second gate electrode 124b, a third gate electrode 124c, and other layers or an external driving circuit.

The divided reference voltage line 131 is connected to first storage electrodes 135 and 136 and a reference electrode 137. Second storage electrodes 138 and 139, which are not connected to the divided reference voltage line 131, are disposed on the first insulation substrate 110 and overlap a second subpixel electrode 191b.

A gate insulating layer 140 is disposed on the gate line 121 and the divided reference voltage line 131.

A first semiconductor 154a, a second semiconductor 154b and a third semiconductor 154c are disposed on the gate insulating layer 140.

A plurality of ohmic contacts 163a, 165a, 163b, 165b, 163c and 165c is disposed on the semiconductors 154a, 154b and 154c.

A data conductor including a plurality of data lines 171 including a first source electrode 173a and a second source electrode 173b, a first drain electrode 175a, a second drain electrode 175b, a third source electrode 173c and a third drain electrode 175c is disposed on the ohmic contacts 163a, 165a, 163b, 165b, 163c and 165c and the gate insulating layer 140.

In an exemplary embodiment, the data conductor and the semiconductors and ohmic contacts below the data conductor may be provided, e.g., formed, during a same process using a single mask.

The data line 171 includes a wide end portion (not illustrated) for connection with other layers or an external driving circuit.

The first gate electrode 124a, the first source electrode 173a and the first drain electrode 175a collectively define the first thin film transistor Qa together with a first semiconductor island 154a, and a channel of the first thin film transistor is formed in the semiconductor 154a between the first source electrode 173a and the first drain electrode 175a. Similarly, the second gate electrode 124b, the second source electrode 173b and the second drain electrode 175b collectively define the second thin film transistor Qb together with a second semiconductor island 154b, and a channel of the second thin film transistor is formed in the semiconductor 154b between the second source electrode 173b and the second drain electrode 175b. The third gate electrode 124c, the third source electrode 173c and the third drain electrode 175c collectively define the third thin film transistor Qc together with a third semiconductor island 154c, and a channel of the third thin film transistor is formed in the semiconductor 154c between the third source electrode 173c and the third drain electrode 175c.

The second drain electrode 175b is connected to the third source electrode 173c and includes a widely extended extension 177.

A first passivation layer 180p is disposed on the data conductor 171, 173c, 175a, 175b and 175c, and exposed portions of the semiconductors 154a, 154b and 154c. The first passivation layer 180p may include an inorganic insulating layer including silicon nitride or silicon oxide, for example. The first passivation layer 180p may effectively prevent a pigment of a color filter 230 from flowing into the exposed portions of the semiconductors 154a, 154b, and 154c.

The color filter 230 is disposed on the first passivation layer 180p. The color filter 230 extends in a vertical direction along two data lines which are adjacent to each other. A first light blocking member 220 is positioned on the first passivation layer 180p, an edge of the color filter 230 and the data line 171.

The first light blocking member 220 extends along the data line 171 and is positioned between two adjacent color filters 230. A width of the first light blocking member 220 may be greater than a width of the data line 171. In such an embodiment, where the width of the first light blocking member 220 is greater than the width of the data line 171, the first light blocking member 220 may effectively prevent light incident from outside from being reflected onto the surface of the data line 171 including metal and interfering with light passing through the liquid crystal layer 3. In such an embodiment, the light is effectively prevented from being reflected onto the surface of the data line 171 such that a contrast ratio of the liquid crystal display is substantially improved.

A second passivation layer 180q is disposed on the color filter 230 and the first light blocking member 220.

The second passivation layer 180q may include an inorganic insulating layer such as silicon nitride or silicon oxide. The second passivation layer 180q effectively prevents the color filter 230 from being lifted and effectively prevents a defect such as an afterimage which may occur when a screen is driven by suppressing contamination of the liquid crystal layer 3 due to an organic material such as a solvent which may flows in from the color filter 230.

A first contact hole 185a and a second contact hole 185b, which expose the first drain electrode 175a and the second drain electrode 175b, respectively, are defined, e.g., formed, in the first passivation layer 180p and the second passivation layer 180q.

A third contact hole 185c that exposes a portion of the reference electrode 137 and a portion of the third drain electrode 175c is formed in the first passivation layer 180p, the second passivation layer 180q and the gate insulating layer 140, and the third contact hole 185c is covered by a connecting member 195. The connecting member 195 electrically connects the reference electrode 137 and the third drain electrode 175c, which are exposed through the third contact hole 185c.

A plurality of pixel electrodes 191 is disposed on the second passivation layer 180q. Each of the pixel electrodes 191 is spaced apart from each other with the gate line 121 therebetween, and the pixel electrodes 191 includes a first subpixel electrode 191a and a second subpixel electrode 191b, which are adjacent to each other in a column direction interposing the gate line 121. The pixel electrode 191 may include a transparent material such as indium tin oxide ("ITO") and indium zinc oxide ("IZO"), for example. The pixel electrode 191 may include a transparent conductive material such as ITO and IZO, for example, or a metal such as aluminum, silver, chromium, copper, molybdenum, titanium, or an alloy thereof, for example.

Each of the first subpixel electrode 191a and the second subpixel electrode 191b include a unit electrode shown in FIG. 4, but not being limited thereto. In an exemplary embodiment, the unit electrode may be variously modified.

The first subpixel electrode 191a and the second subpixel electrode 191b are physically and electrically connected to the first drain electrode 175a and the second drain electrode 175b, respectively, through the first contact hole 185a and the second contact hole 185b, respectively, and the first subpixel electrode 191a and the second subpixel electrode 191b receive data voltages from the first drain electrode 175a and the second drain electrode 175b, respectively. In an exemplary embodiment, a part of the data voltage applied to the second drain electrode 175b is divided through the third source electrode 173c, such that a magnitude of the voltage applied to the first subpixel electrode 191a is greater than a magnitude of voltage applied to the second subpixel electrode 191b.

The first subpixel electrode 191a and the second subpixel electrode 191b applied with the data voltages generate an electric field together with a common electrode 270 of the upper panel 200 to determine directions of liquid crystal molecules of the liquid crystal layer 3 between the pixel and common electrodes 191 and 270. Luminance of light passing through the liquid crystal layer 3 changes according to the determined directions of the liquid crystal molecules. Though the liquid crystal display according to the embodiment includes the common electrode 270 of the upper panel 200, the liquid crystal display according to another embodiment of the present invention includes a common electrode disposed on the lower panel 100. Further, the liquid crystal display according to another embodiment of the present invention further includes additional electrode to generate an electric field to the liquid crystal layer.

A second light blocking member 330 is positioned on the pixel electrode 191. The second light blocking member 330 is disposed to cover substantially an entire of a region, in which the first transistor Qa, the second transistor Qb, the third transistor Qc and the first to third contact holes 185a, 185b, and 185c are disposed, and extends in the same direction as the gate line 121 and crosses a portion of the data line 171. The second light blocking member 330 overlap at least a portion of the two data lines 171 which are disposed at both sides of a pixel area such that light leakage that may occur around the data line 171 and the gate line 121 and light leakage in a region, where the first transistor Qa, the second transistor Qb and the third transistor Qc are positioned, are effectively prevented.

In an exemplary embodiment, the second light blocking member 330 may be provided after providing the first passivation layer 180p, the color filter 230 and the second passivation layer 180q in the region where the first transistor Qa, the second transistor Qb, the third transistor Qc and the first to third contact holes 185a, 185b, and 185c are positioned, such that the positions of the first transistor Qa, the second transistor Qb, the third transistor Qc and the first to third contact holes 185a, 185b and 185c are efficiently distinguished.

Hereinafter, the upper panel 200 will be described.

The upper panel 200 includes a second insulation substrate 210 and a common electrode 270 disposed on the second insulation substrate 210. An upper alignment layer (not shown) is disposed on the common electrode 270. In an exemplary embodiment, the upper alignment layer may be a vertical alignment layer. Though the liquid crystal display according to the embodiment includes the common electrode 270 of the upper panel 200, the liquid crystal display according to another embodiment of the present invention includes a common electrode disposed on the lower panel 100. Further, the liquid crystal display according to another embodiment of the present invention further includes additional electrode to generate an electric field to the liquid crystal layer.

In an exemplary embodiment, the liquid crystal layer 3 has negative dielectric anisotropy, and longitudinal axes of the liquid crystal molecules in the liquid crystal layer 3 are aligned substantially vertical to surfaces, e.g., inner surfaces, of the lower and upper panels 100 and 200 when the electric field is not generated therein. However, according to the liquid crystal display of another embodiment of the present invention, the liquid crystal molecules in the liquid crystal layer 3 may be aligned substantially parallel to surfaces of the lower and upper panels 100 and 200.

A unit electrode of an exemplary embodiment of the subpixel electrode 191 will now be described with reference to FIG. 4.

As illustrated in FIG. 4, in an exemplary embodiment, the overall shape of the unit electrode is a quadrangle, and the unit electrode includes a cross stem including a horizontal stem 193 and a vertical stem 192 substantially perpendicular to each other. In such an embodiment, the unit electrode is divided into a first subregion Da, a second subregion Db, a third subregion Dc and a fourth subregion Dd by the horizontal stem 193 and the vertical stem 192, and the first to fourth subregions Da to Dd include a plurality of first minute branches 194a, a plurality of second minute branches 194b, a plurality of third minute branches 194c, and a plurality of fourth minute branches 194d, respectively.

The first minute branch 194a extends obliquely in an upper left direction from the horizontal stem 193 or the vertical stem 192, and the second minute branch 194b extends obliquely in an upper right direction from the horizontal stem 193 or the vertical stem 192. The third minute branch 194c extends obliquely in a lower left direction from the horizontal stem 193 or the vertical stem 192, and the fourth minute branch 194d extends obliquely in a lower right direction from the horizontal stem 193 or the vertical stem 192.

In an exemplary embodiment, the first to fourth minute branches 194a, 194b, 194c and 194d form angles of about 45 or 135 degrees with the gate line 121 or the horizontal stem 193. In such an embodiment, the minute branches 194a, 194b, 194c and 194d of two adjacent subregions Da, Db, Dc and Dd are substantially perpendicular to each other.

In an exemplary embodiment, widths of the minute branches 194a, 194b, 194c, and 194d may be in a range of about 2.5 micrometers (μm) to about 5.0 μm, and a distance between the adjacent minute branches 194a, 194b, 194c and 194d in each subregion Da, Db, Dc or Dd may be in a range of about 2.5 μm to about 5.0 μm.

According to an alternative exemplary embodiment of the invention, the widths of the minute branches 194a, 194b, 194c and 194d may be increased as being closer to the horizontal stem 193 or the vertical stem 192, and a difference between the largest portion and the smallest portion in the width of each minute branches 194a, 194b, 194c or 194d may be in a range of about 0.2 μm to about 1.5 μm.

Referring back to FIGS. 2 and 3, the first subpixel electrode 191a and the second subpixel electrode 191b are connected to the first drain electrode 175a and the second drain electrode 175b, respectively, through the first contact hole 185a and the second contact hole 185b, respectively, and receive the data voltages from the first drain electrode 175a and the second drain electrode 175b, respectively. In an exemplary embodiment, sides of the first to fourth minute branches 194a, 194b, 194c and 194d distort the electric field to generate horizontal components that determine inclined directions of the liquid crystal molecules 31. The horizontal components of the electric field are substantially parallel to the sides of the first to fourth minute branches 194a, 194b, 194c and 194d. Accordingly, as illustrated in FIG. 4, the liquid crystal molecules 31 are inclined in directions substantially parallel to longitudinal directions of the minute branches 194a, 194b, 194c and 194d. In such an embodiment, as each unit pixel electrode 191 includes four subregions, e.g., the first to fourth subregions Da to Dd, having different longitudinal directions of the minute branches 194a, 194b, 194c and 194d, the inclined directions of the liquid crystal molecules 31 are substantially four directions, and four domains having different alignment directions of the liquid crystal molecules 31 are provided on the liquid crystal layer 3. In such an embodiment, when the inclined directions of the liquid crystal molecules are various, a reference viewing angle of the liquid crystal display is substantially increased.

Now, a method of an initial alignment of the liquid crystal molecules 31 having pretilts will be described with reference to FIG. 5.

FIG. 5 is a diagram illustrating a process in which liquid crystal molecules have pretilts using a prepolymer polymerized by light such as ultraviolet light.

First, a prepolymer 33, such as monomers cured by polymerization due to light such as ultraviolet light, is injected between the lower and upper panels 100 and 200 together with a liquid crystal material. The prepolymer 33 may be reactive mesogen polymerized by the light such as ultraviolet light. The prepolymer 33 may be injected in the alignment layer disposed on the lower panel 100 or the upper panel 200.

Next, the data voltages are applied to the first subpixel electrode 191a and the second subpixel electrode 191b and common voltage is applied to the common electrode 270 of the upper panel 200 to generate the electric field in the liquid crystal layer 3 between the lower and upper panels 100 and 200. Then, the liquid crystal molecules 31 of the liquid crystal layer 3 are inclined in the directions substantially parallel to the longitudinal directions of the minute branches 194a, 194b, 194c and 194d in response to the electric field through the processes described above, and the liquid crystal molecules 31 are provided to have total four inclined directions in a unit pixel.

When the electric field is generated and then the light such as ultraviolet light is irradiated in the prepolymer 33, the prepolymer 33 is polymerized to form a polymer 370 as illustrated in FIG. 5. The polymer 370 is formed to contact the panels 100 and 200. Alignment directions of the liquid crystal molecules 31 are determined to have pretilts in the directions described above. Accordingly, in a state where the voltage is not applied to the field generating electrodes 191 and 270, the liquid crystal molecules 31 are aligned to have pretilts in four different directions. However, the polymer 370 is formed in the liquid crystal layer 3 or in the alignment layer disposed on the lower panel 100 or the upper panel 200.

Figure 6:
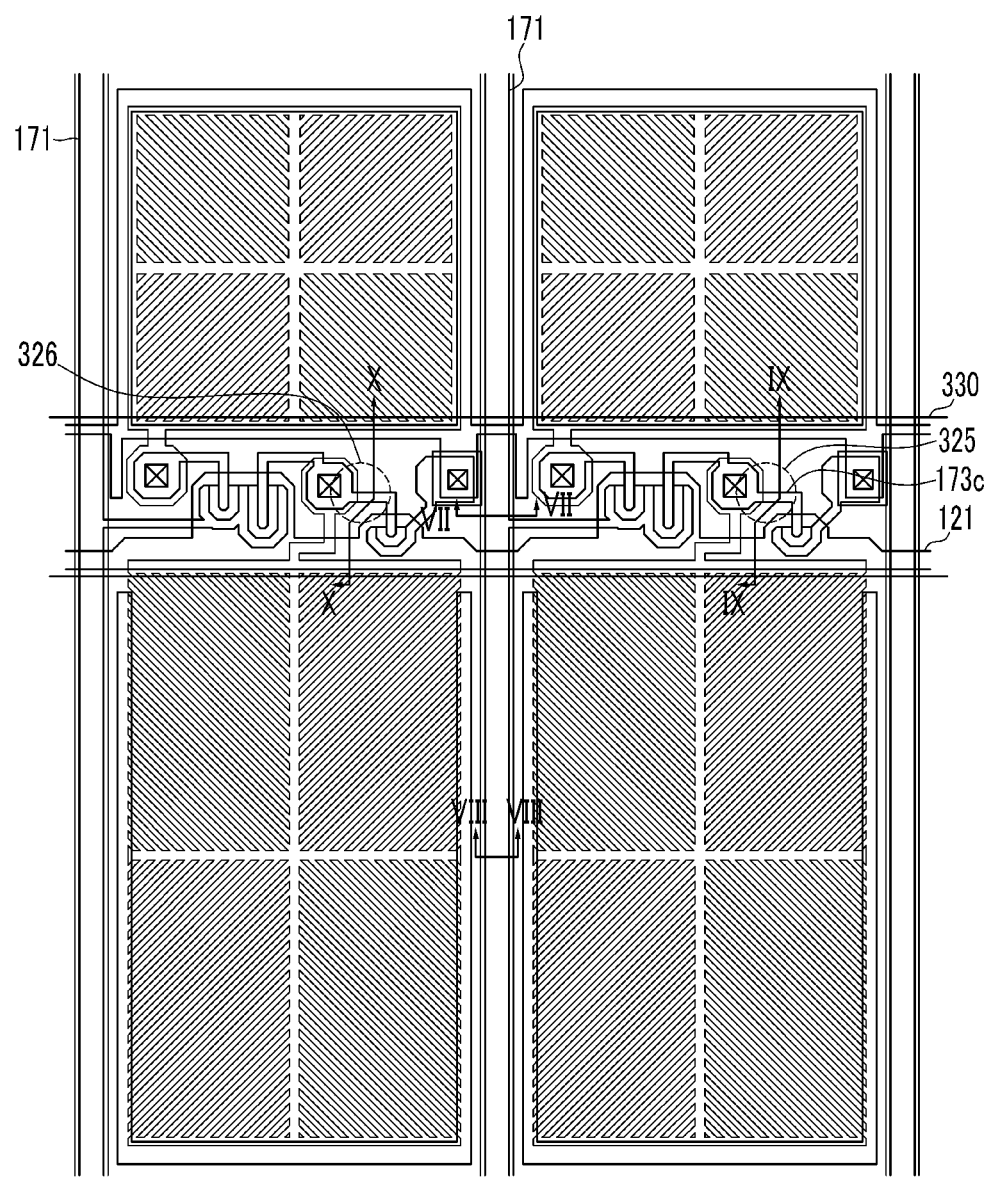
FIG. 6 is a top plan view of two pixels of an exemplary embodiment of the liquid crystal display according to the invention.
Figure 7:
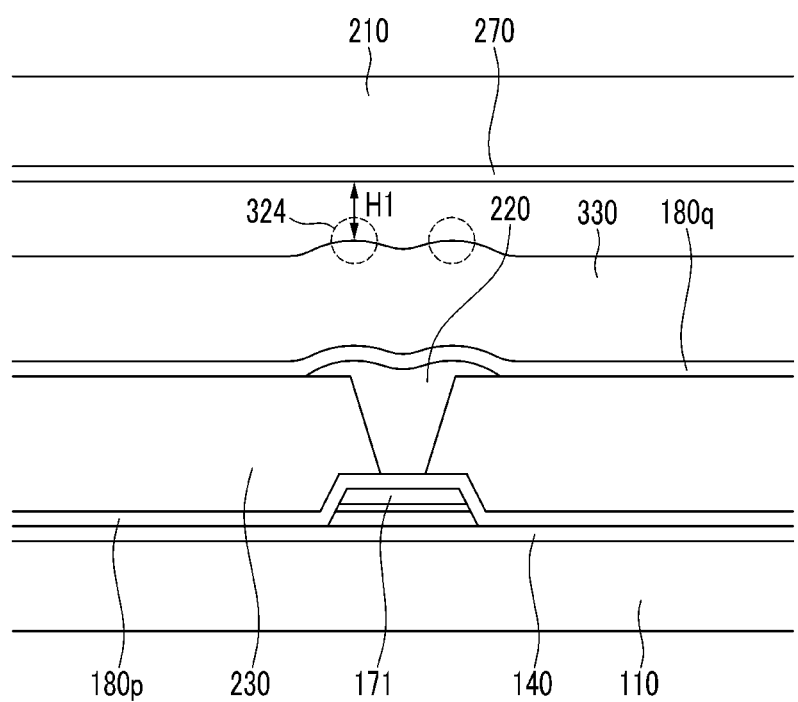
FIG. 7 is a cross-sectional view taken along line VII-VII of the liquid crystal display of FIG. 6.
Figure 8:
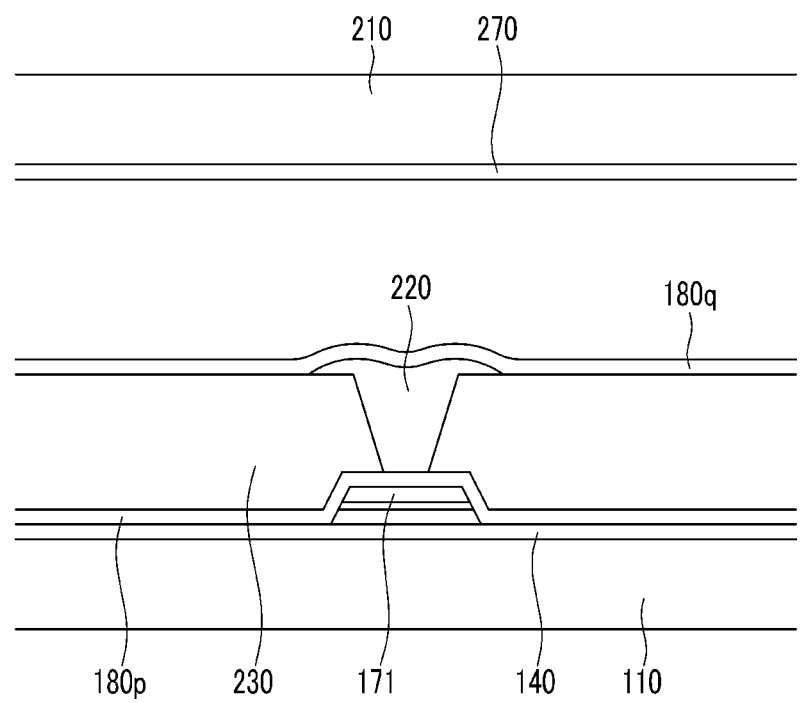
FIG. 8 is a cross-sectional view taken along line VIII-VIII of the liquid crystal display of FIG. 6.
Figure 9:
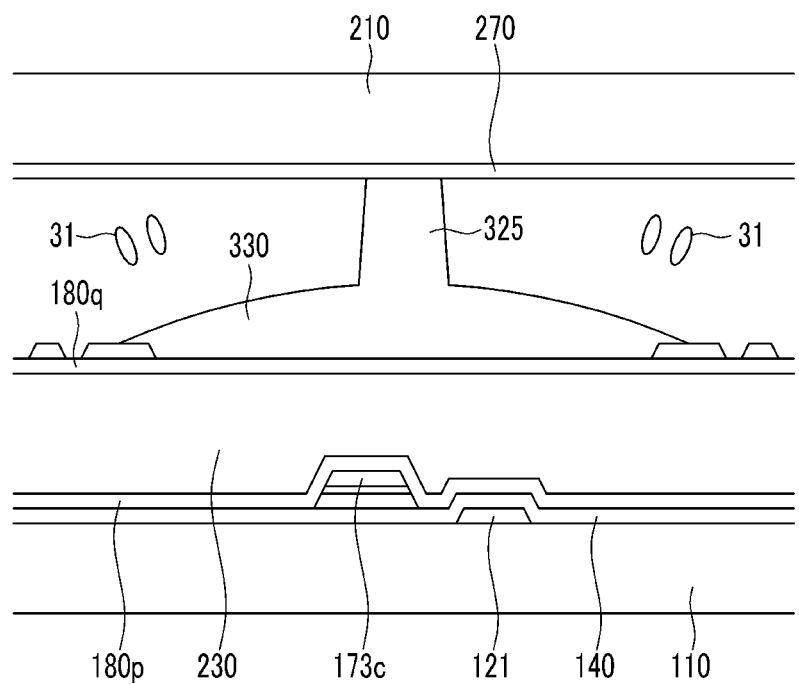
FIG. 9 is a cross-sectional view taken along line IX-IX of the liquid crystal display of FIG. 6.
Figure 10:
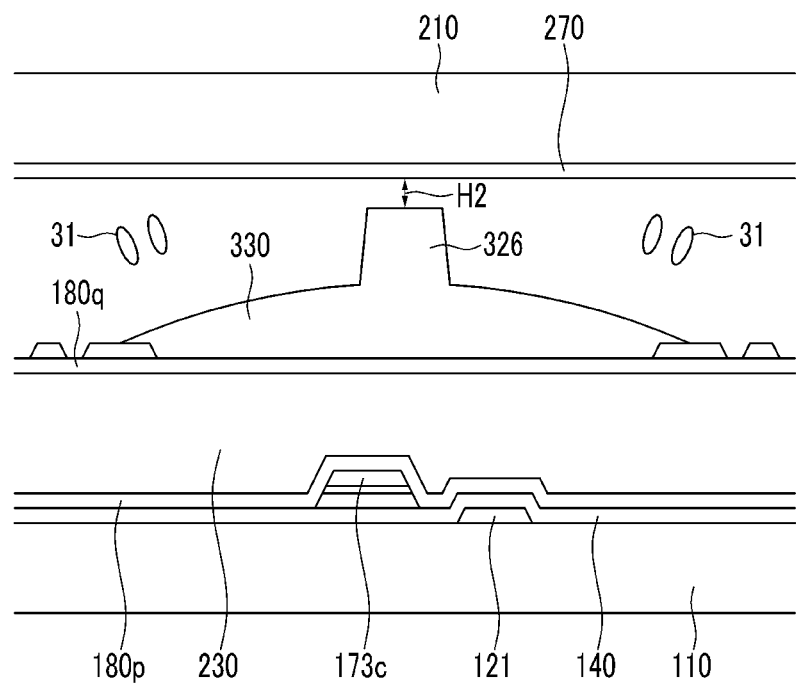
FIG. 10 is a cross-sectional view taken along line X-X of the liquid crystal display of FIG. 6.

Hereinafter, a detailed layout of the first light blocking member 220 and the second light blocking member 330 of an exemplary embodiment of the liquid crystal display according to the invention will be described with reference to FIGS. 6 to 10. FIG. 6 is a top plan view of two pixels of an exemplary embodiment of the liquid crystal display according to the invention, FIG. 7 is a cross-sectional view taken along line VII-VII of the liquid crystal display of FIG. 6, FIG. 8 is a cross-sectional view taken along line VIII-VIII of the liquid crystal display of FIG. 6, and FIG. 9 is a cross-sectional view taken along line IX-IX of the liquid crystal display of FIG. 6. FIG. 10 is a cross-sectional view taken along line X-X of the liquid crystal display of FIG. 6.

Referring to FIGS. 6 to 10, in an exemplary embodiment, the color filter 230, the first light blocking member 220 and the second light blocking member 330 of the liquid crystal display are positioned on the lower panel 100 with the first to third thin film transistors Qa, Qb and Qc. In such an embodiment, light leakage due to arrangement error between the lower and upper substrates 100 and 200 is effectively prevented by providing the color filter, the light blocking member and the thin film transistor in a same substrate, e.g., the lower substrate 100.

In such an embodiment, the color filter 230 is positioned between two adjacent data lines 171, and the first light blocking member 220 extends along each of the two adjacent data lines 171 positioned at both sides of the pixel electrode 191. In an exemplary embodiment, a width of the first light blocking member 220 may be greater than a width of the data line 171. In such an embodiment, where the width of the first light blocking member 220 is greater than the width of the data line 171, light incident from the outside is effectively prevented from being reflected onto the surface of the data line 171 including metal and interfering with the light passing through the liquid crystal layer 3, such that a contrast ratio of the liquid crystal display is substantially improved.

The second light blocking member 330 is disposed to cover substantially an entire of a region, in which the first transistor Qa, the second transistor Qb, the third transistor Qc and the first to third contact holes 185a, 185b, and 185c are positioned, and the second light blocking member 330 extends substantially in the same direction as the gate line 121 and crossing the data line 171, e.g., overlapping a portion of the data line 171. The second light blocking member 330 overlaps at least a portion of each of the two data lines 171, which are disposed at both sides of a corresponding pixel area, such that light leakage that may occur around the data line 171, the gate line 121 and the divided reference voltage line 131 is effectively prevented, and light leakage in the region, where the first transistor Qa, the second transistor Qb and the third transistor Qc are positioned, is effectively prevented.

In an exemplary embodiment, the second light blocking member 330 may be provided after providing the first passivation layer 180p, the color filter 230 and the second passivation layer 180q in the region where the first transistor Qa, the second transistor Qb, the third transistor Qc and the first to third contact holes 185a, 185b and 185c are positioned, such that the positions of the first transistor Qa, the second transistor Qb, the third transistor Qc and the first to third contact holes 185a, 185b and 185c are efficiently distinguished. In such an embodiment, when defects occur in the first transistor Qa, the second transistor Qb and the third transistor Qc during the manufacturing process, the defects of the first transistor Qa, the second transistor Qb and the third transistor Qc may be repaired before the second light blocking member 330 is provided. In such an embodiment, the color filter 230 is provided in the region, where the first transistor Qa, the second transistor Qb and the third transistor Qc are positioned and covered by the second light blocking member 330 after repairing the defects, to effectively prevent the light leakage, such that the light leakage in the region adjacent to the data line and the gate line is effectively prevented, a performance characteristic of the thin film transistor is substantially improved by not forming an unnecessary thin film to compensate the step of the light blocking member which may occur in the case where the color filter is disposed on the thin film transistor and the light blocking member is disposed on the periphery of the thin film transistor to efficiently repair the thin film transistor. In such an embodiment, light leakage due to the arrangement error is effectively prevented by providing the color filter and the light blocking member on the lower panel 100, e.g., the thin film transistor array panel.

Referring to FIG. 7, a height of an overlapping portion 324 of the first light blocking member 220 and the second light blocking member 330 positioned on the data line 171 is greater than a height of the second light blocking member 330 positioned at another portion. Accordingly, the overlapping portion 324 of the first light blocking member 220 and the second light blocking member 330 may be spaced apart from the upper panel 200 opposed thereto by a first distance H1.

Referring to FIG. 9, the second light blocking member 330 includes a first spacer part 325 having a larger thickness than a peripheral portion thereof. The first spacer part 325 is disposed to contact the upper panel 200. In an exemplary embodiment, the peripheral portion of the second light blocking member 330 and the first spacer part 325 are disposed on the same layer, e.g., on the second passivation layer 180q, such that a manufacturing process is substantially simplified and light leakage that may occur around the first spacer part 325 is effectively prevented.

In an exemplary embodiment, the second light blocking member 330 extends in a horizontal direction in the region where the first transistor Qa, the second transistor Qb, the third transistor Qc and the first to third contact holes 185a, 185b and 185c are positioned. In such an embodiment, the liquid crystal molecules 31 disposed between the region with the second light blocking member 330 and the region with the pixel electrode 191 may be inclined toward the pixel electrode 191 by the second light blocking member 330 such that irregular movement of the liquid crystal molecules 31 disposed between the pixel electrode 191 and the second light blocking member 330 is substantially reduced.

As described above, in an exemplary embodiment, the first spacer part 325 may serve to maintain a cell gap between the lower and upper panels 100 and 200 of the liquid crystal display, and as described with reference to FIG. 7, the overlapping portion 324 of the first light blocking member 220 and the second light blocking member 330 may serve to maintain the cell gap when pressure or the like is applied from the outside.

In an exemplary embodiment, referring to FIG. 10, the second light blocking member 330 may include a second spacer part 326. A thickness of the second spacer part 326 is greater than a thickness of the peripheral portion of the second light blocking member 330, but may be less than the thickness of the first spacer part 325. The second spacer part 326 may be spaced apart from the upper panel 200 opposed thereto by a second distance H2. In such an embodiment, the second spacer part 326 may serve to maintain a cell gap when the pressure or the like is applied from the outside.

As described above with reference to FIG. 7, as the overlapping portion 324 of the first light blocking member 220 and the second light blocking member 330 maintains the cell gap when the pressure or the like is applied from the outside, the second spacer part 326 of the second light blocking member 330 may be omitted in an alternative exemplary embodiment. In such an embodiment where the second light blocking member 330 does not include the second spacer part 326, the second light blocking member 330 may be provided to have two different thicknesses at the first spacer part 325 and the peripheral area thereof such that the step is easily controlled and thus accuracy in the process is improved and manufacturing costs are reduced, as compared with an embodiment where the second light blocking member 330 have three portions having three different thicknesses by having both the first spacer part 325 and the second spacer part 326.

In an exemplary embodiment, as shown in FIG. 6, at least one of the first spacer part 325 and the second spacer part 326 may be disposed in each pixel area. In an alternative exemplary embodiment, one of the first spacer part 325 and the second spacer part 326 are provided not in all of the pixel areas, but in some pixel areas of the pixel areas.

Figure 11:
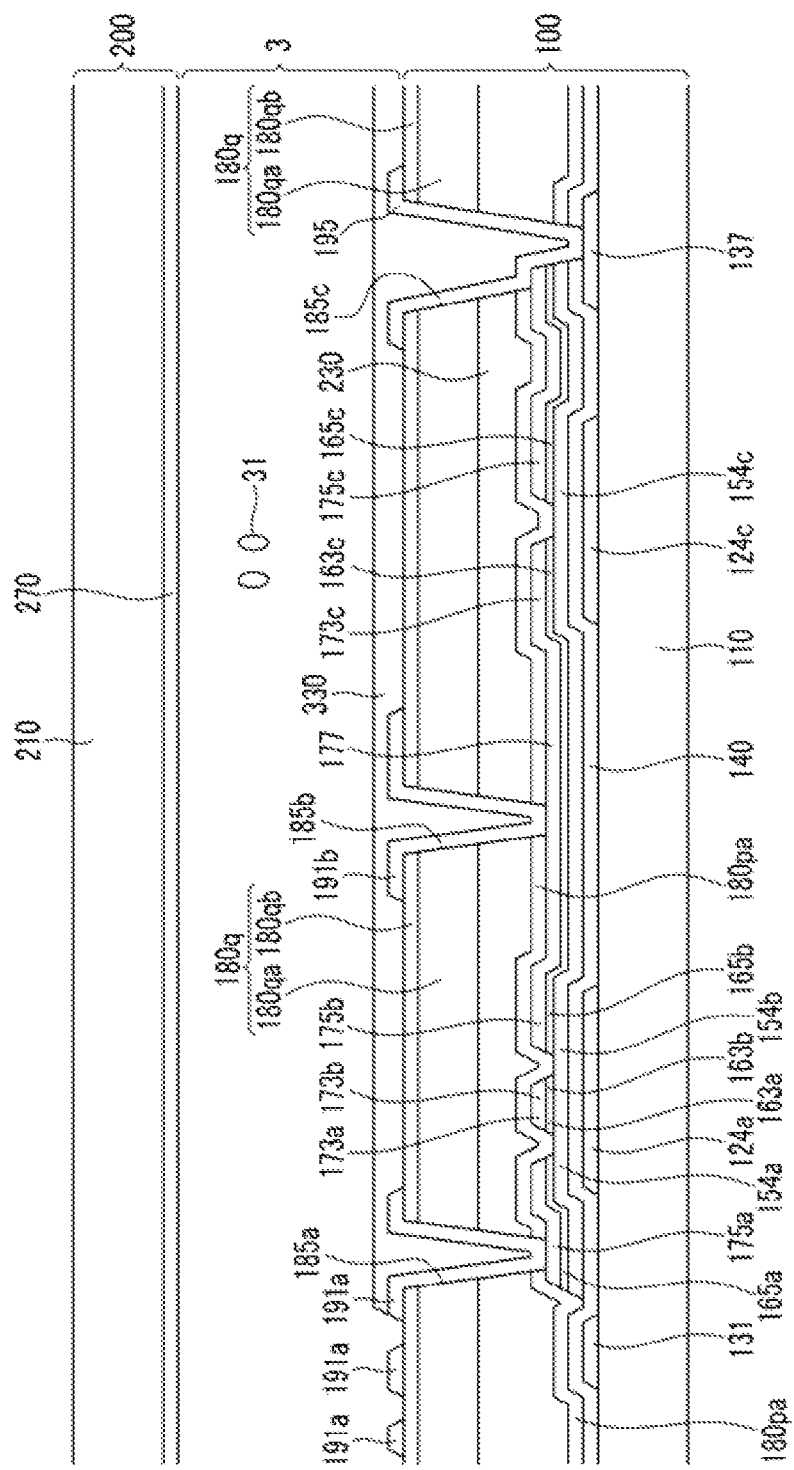
FIG. 11 is a cross-sectional view of another alternative exemplary embodiment of the liquid crystal display according to the invention, which corresponds to a cross-sectional view taken along line III-III of the liquid crystal display of FIG. 2.
Figure 12:
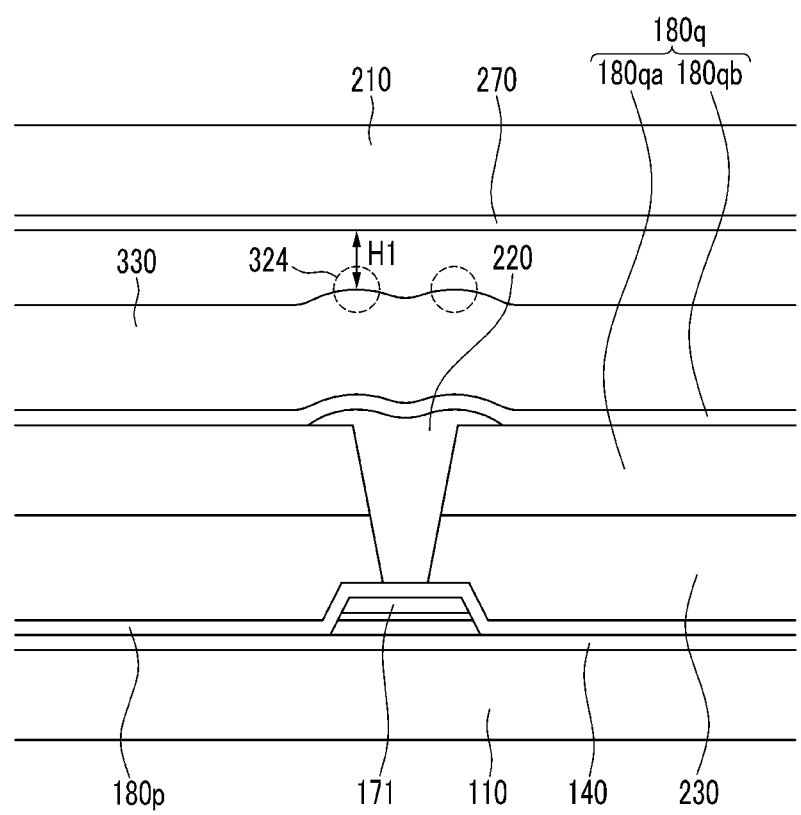
FIGS. 12 to 14 are cross-sectional views of an alternative exemplary embodiment of the liquid crystal display according to the invention, which correspond to cross-sectional views taken along lines VII-VII, VIII-VIII and IV-IV of the liquid crystal display of FIG. 6.
Figure 13:
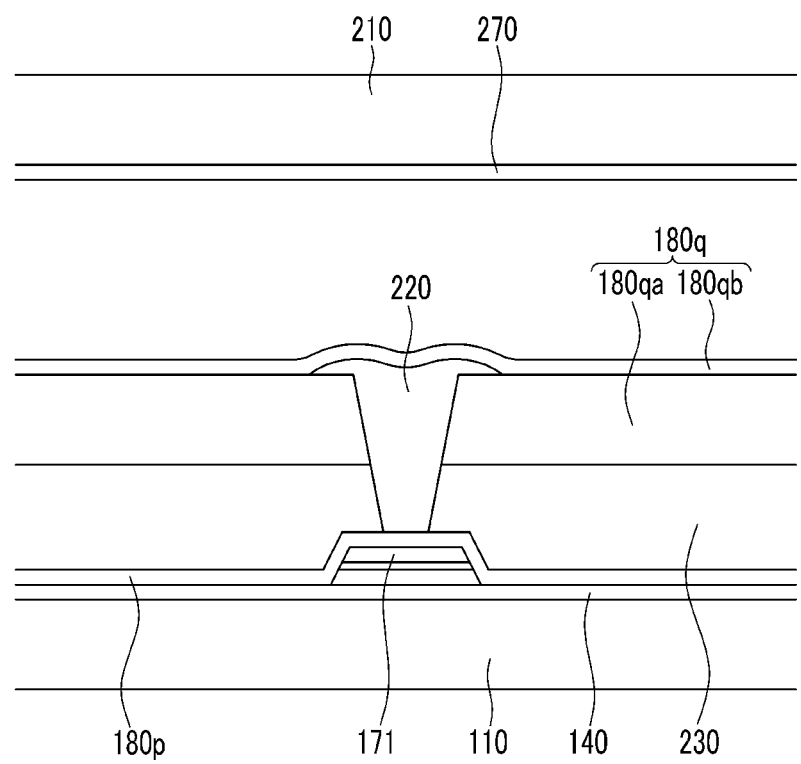
Figure 14:
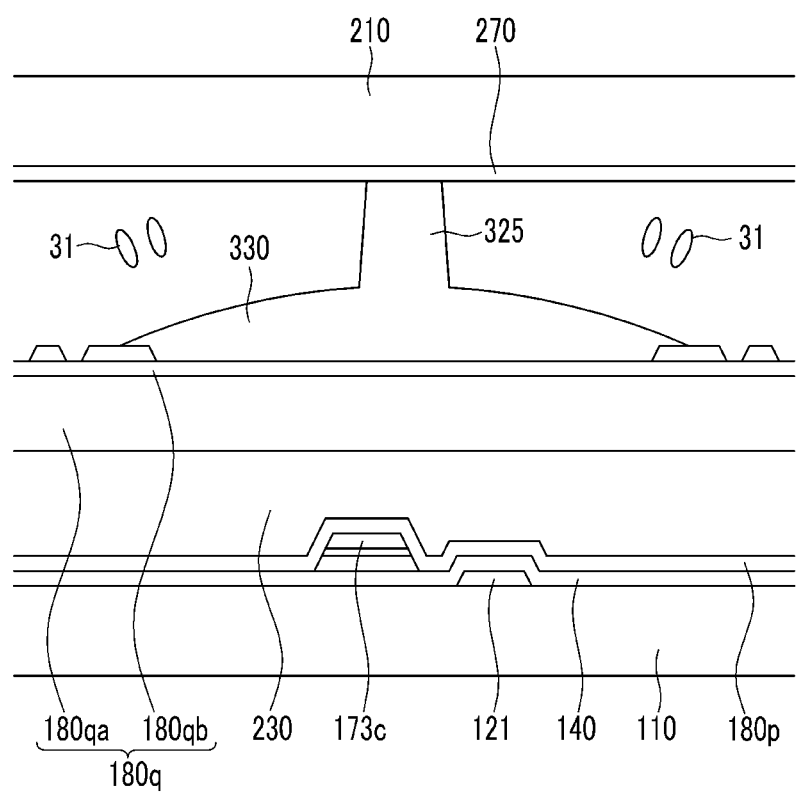

Now, an alternative exemplary embodiment of a liquid crystal display according to the invention will be described with reference to FIGS. 11 to 14. FIG. 11 is a cross-sectional view of an alternative exemplary embodiment of the liquid crystal display according to the invention, which corresponds to a cross-sectional view taken along line III-III of the liquid crystal display of FIG. 2. FIGS. 12 to 14 are cross-sectional views of an alternative exemplary embodiment of the liquid crystal display according to the invention, which correspond to cross-sectional views taken along lines VII-VII, VIII-VIII and IV-IV of the liquid crystal display of FIG. 6.

The liquid crystal display of FIGS. 11 to 14 is substantially the same as the liquid crystal display of FIGS. 2, 3 and 6 to 10 except the second passivation layer 180*q*. The same or like elements shown in FIGS. 11 to 14 have been labeled with the same reference characters as used above to describe the exemplary embodiments of the liquid crystal display shown in FIGS. 2, 3 and 6 to 10, and any repetitive detailed description thereof will hereinafter be omitted or simplified.

In an exemplary embodiment, as shown in FIGS. 11 to 14, the second passivation layer 180*q* includes a lower layer 180*qa* and an upper layer 180*qb*. The lower layer 180*qa* of the second passivation layer 180*q* includes an organic insulating layer, and the upper layer 180*qb* of the second passivation layer 180*q* includes an inorganic insulating layer such as silicon nitride or silicon oxide, for example. In an alternative exemplary embodiment of the invention, the lower layer 180*qa* of the second passivation layer 180*q* may include an inorganic insulating layer, and the upper layer 180*qb* of the second passivation layer 180*q* may include an organic insulating layer.

As described above, an exemplary embodiment of the liquid crystal display according to the invention includes the color filter 230 disposed between the two adjacent data lines 171, the first light blocking member 220 disposed along the data line 171, and the second light blocking member 330 disposed on the color filter 220 covering the thin film transistors, and the first light blocking member 220 and the second light blocking member 330 are overlapping each other. Accordingly, light leakage in the region adjacent to the data line and the gate line is effectively prevented while the light leakage due to the arrangement error is effectively prevented by providing the color filter and the light blocking member on the thin film transistor array panel, e.g., the lower panel 100, and a performance characteristic of the thin film transistor is substantially improved by not forming an unnecessary thin film to compensate the step of the light blocking member which may occur in the case where the color filter is disposed on the thin film transistor and the light blocking member is disposed on the periphery of the thin film transistor to efficiently repair the thin film transistor.

In such an embodiment, the overlapping portion of the first light blocking member and the second light blocking member serve as the spacer, and the manufacturing process is substantially simplified without a process for providing a sub spacer.

Other features of the liquid crystal display described with reference to FIGS. 2, 3, and 6 to 10 may be applied to the exemplary embodiment of the liquid crystal display of FIGS. 11 to 14.

Figure 15:
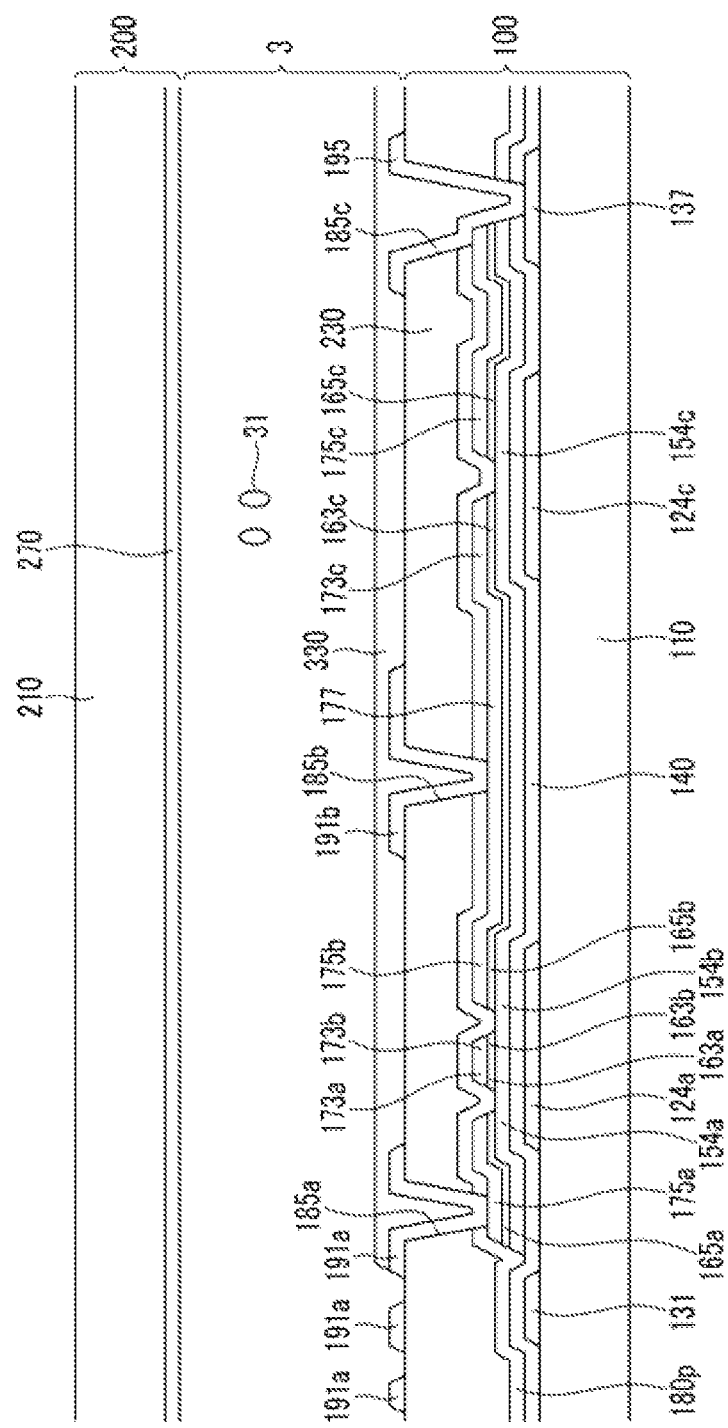
FIG. 15 is a cross-sectional view of an alternative exemplary embodiment of the liquid crystal display according to the invention, which corresponds to a cross-sectional view taken along line III-III of the liquid crystal display of FIG. 2.
Figure 16:
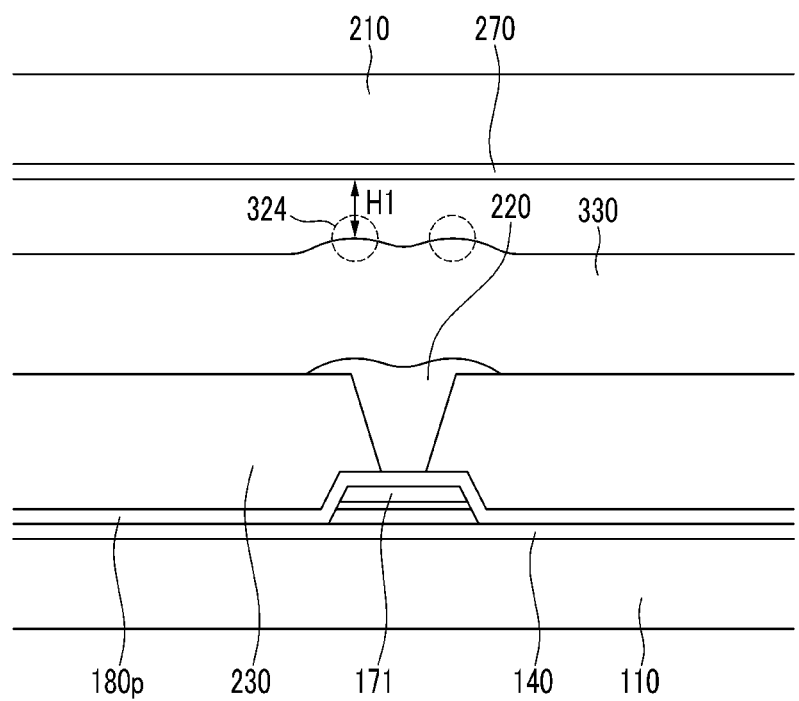
FIGS. 16 to 18 are cross-sectional views of an alternative exemplary embodiment of the liquid crystal display according to the invention, which correspond to cross-sectional views taken along lines VII-VII, VIII-VIII and IV-IV of the liquid crystal display of FIG. 6.
Figure 17:
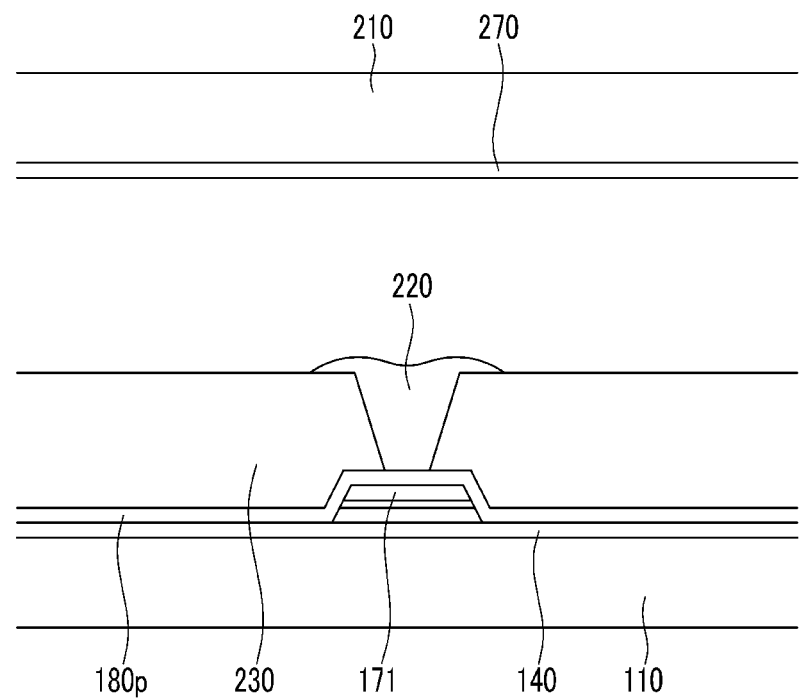
Figure 18:
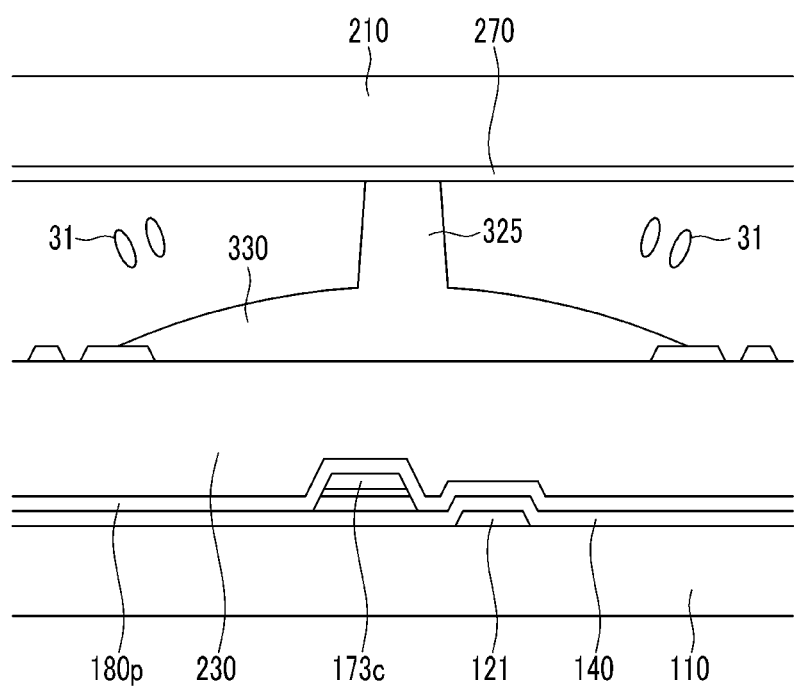

Now, another alternative exemplary embodiment of a liquid crystal display according to the invention will be described with reference to FIGS. 15 to 18. FIG. 15 is a cross-sectional view of another alternative exemplary embodiment of a liquid crystal display according to the invention, which corresponds to a cross-sectional view taken along line III-III of the liquid crystal display of FIG. 2. FIGS. 16 to 18 are cross-sectional views of another alternative exemplary embodiment of the liquid crystal display according to the invention, which correspond to the cross-sectional views taken along lines VII-VII, VIII-VIII and IV-IV of the liquid crystal display of FIG. 6.

The liquid crystal display of FIGS. 15 to 18 is substantially the same as the liquid crystal display shown in FIGS. 2, 3 and 6 to 10. The same or like elements shown in FIGS. 15 to 18 have been labeled with the same reference characters as used above to describe the exemplary embodiments of the liquid crystal display shown in FIGS. 2, 3 and 6 to 10, and any repetitive detailed description thereof will hereinafter be omitted or simplified.

In an exemplary embodiment of the liquid crystal display, as shown in FIGS. 15 to 18, the second passivation layer 180*q* may be omitted.

As described above, an exemplary embodiment of the liquid crystal display according to the invention includes the color filter 230 disposed between the two adjacent data lines 171, the first light blocking member 220 disposed along the data line 171, and the second light blocking member 330 disposed on the color filter 220 covering the thin film transistors, and the first light blocking member 220 and the second light blocking member 330 are overlapping each other. Accordingly, light leakage in the region adjacent to the data line and the gate line is effectively prevented while the light leakage due to the arrangement error is effectively prevented by providing the color filter and the light blocking member on the thin film transistor array panel, e.g., the lower panel 100, and a performance characteristic of the thin film transistor is substantially improved by not forming an unnecessary thin film to compensate the step of the light blocking member which may occur in the case where the color filter is disposed on the thin film transistor and the light blocking member is disposed on the periphery of the thin film transistor to efficiently repair the thin film transistor.

In such an embodiment, the overlapping portion of the first light blocking member and the second light blocking member serve as the spacer, and the manufacturing process is substantially simplified without a process for providing a sub space.

Other features of the liquid crystal display described with reference to FIGS. 2, 3, and 6 to 10 may be applied to the exemplary embodiment of the liquid crystal display of FIGS. 15 to 18.

Figure 19:
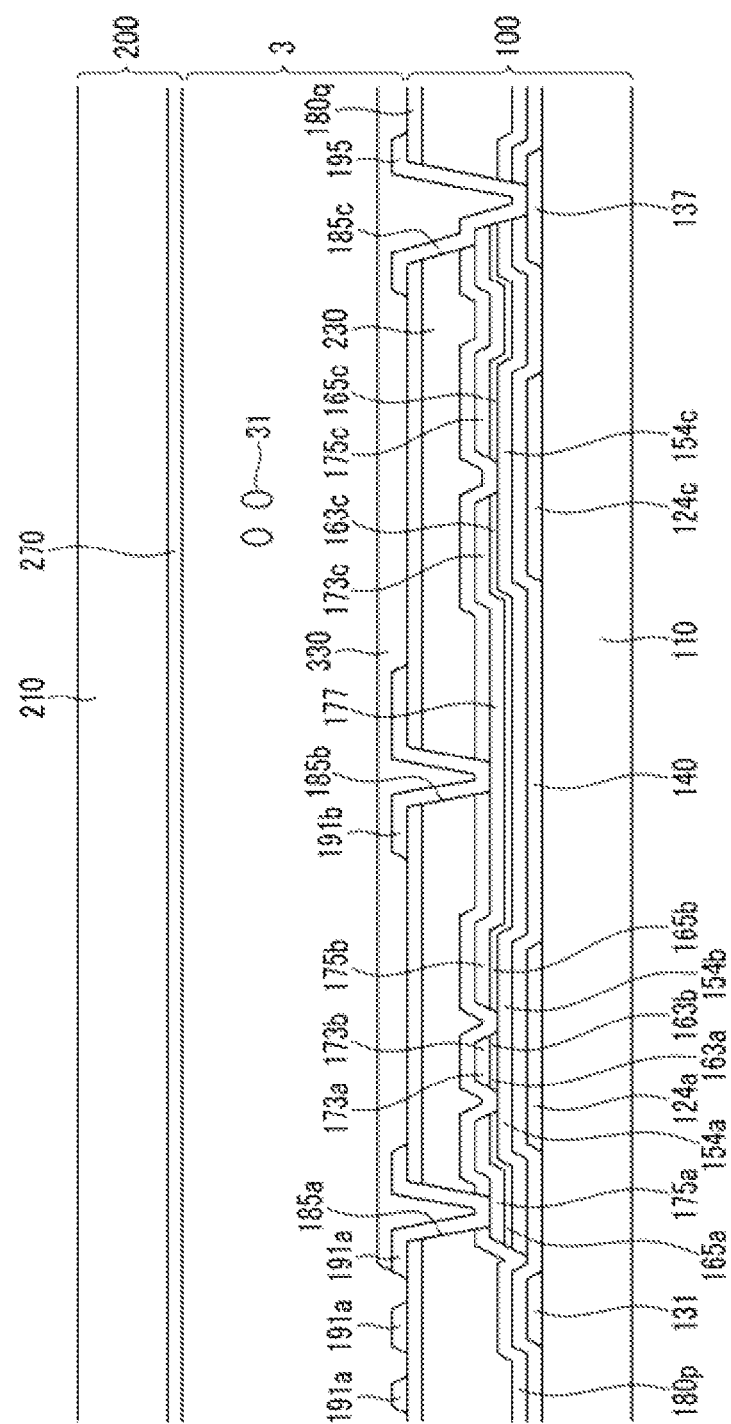
FIG. 19 is a cross-sectional view of an alternative exemplary embodiment of the liquid crystal display according to the invention, which corresponds to a cross-sectional view taken along line III-III of the liquid crystal display of FIG. 2.
Figure 20:
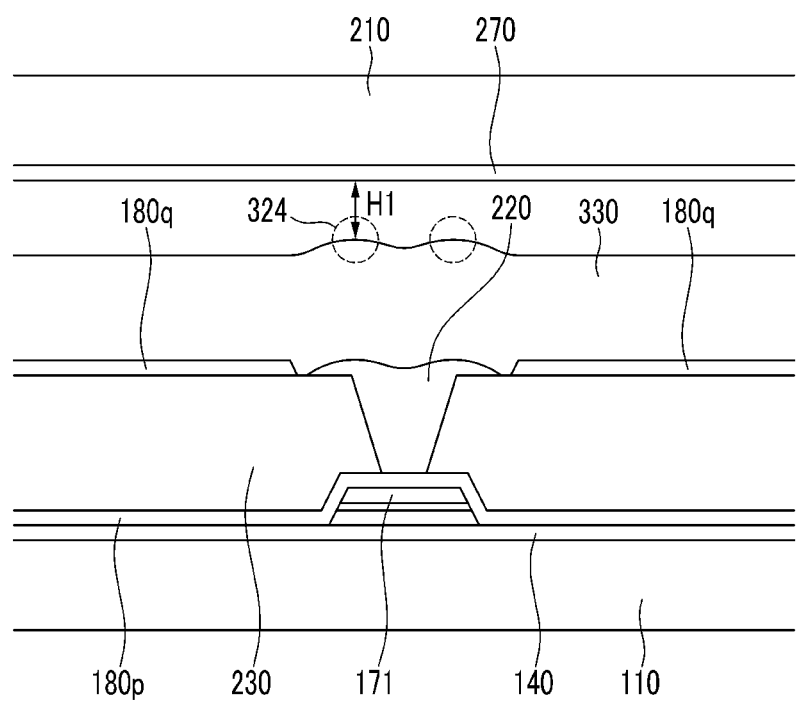
FIGS. 20 to 22 are cross-sectional views of an alternative exemplary embodiment of the liquid crystal display according to another exemplary embodiment of the invention, which correspond to cross-sectional views taken along lines VII-VII, VIII-VIII and IV-IV of the liquid crystal display of FIG. 6.
Figure 21:
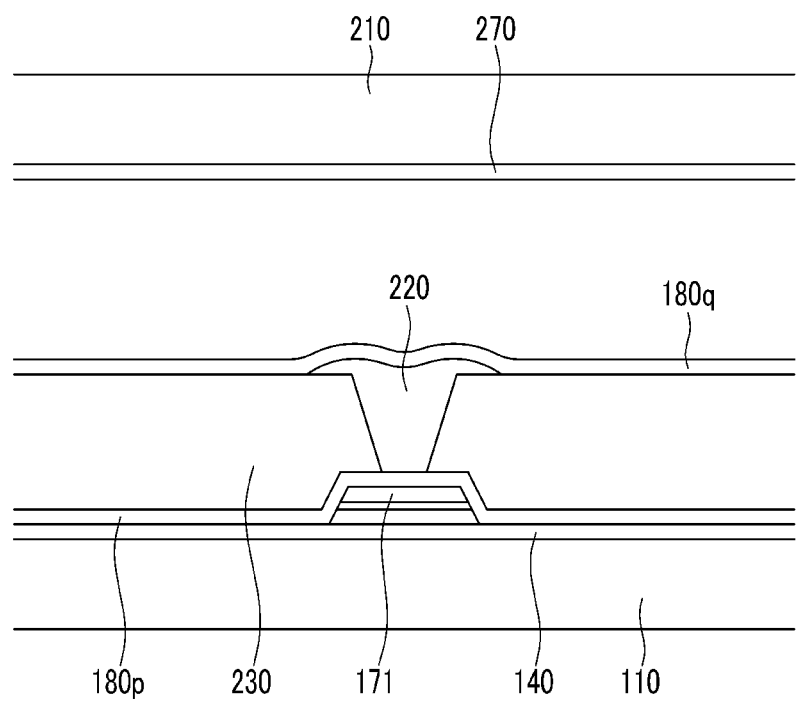
Figure 22:
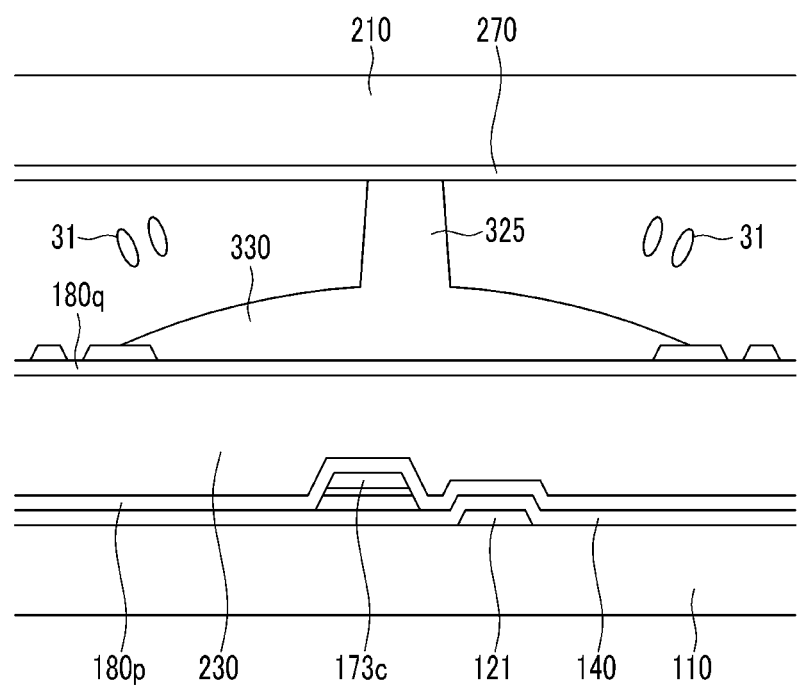

Then, another alternative exemplary embodiment of a liquid crystal display according to the invention will be described with reference to FIGS. 19 to 22. FIG. 19 is a cross-sectional view of another alternative exemplary embodiment of a liquid crystal display according to the invention, which corresponds to a cross-sectional view taken along line III-III of the liquid crystal display of FIG. 2. FIGS. 20 to 22 are cross-sectional views of another alternative exemplary embodiment of the liquid crystal display according to the invention, which correspond to cross-sectional views taken along lines VII-VII, VIII-VIII and IV-IV of the liquid crystal display of FIG. 6.

The liquid crystal display of FIGS. 19 to 22 is substantially the same as the liquid crystal display of FIGS. 2, 3, and 6 to 10 except for the second passivation layer 180q. The same or like elements shown in FIGS. 19 to 22 have been labeled with the same reference characters as used above to describe the exemplary embodiments of the liquid crystal display shown in FIGS. 2, 3 and 6 to 10, and any repetitive detailed description thereof will hereinafter be omitted or simplified.

In an exemplary embodiment of the liquid crystal display, as shown in FIGS. 19 to 22, a portion of the second passivation layer 180q near the overlapping portion of the first light blocking member 220 and the second light blocking member 330 may be omitted.

As described above, an exemplary embodiment of the liquid crystal display according to the invention includes the color filter 230 disposed between the two adjacent data lines 171, the first light blocking member 220 disposed along the data line 171, and the second light blocking member 330 disposed on the color filter 220 covering the thin film transistors, and the first light blocking member 220 and the second light blocking member 330 are overlapping each other. Accordingly, light leakage in the region adjacent to the data line and the gate line is effectively prevented while the light leakage due to the arrangement error is effectively prevented by providing the color filter and the light blocking member on the thin film transistor array panel, e.g., the lower panel 100, and a performance characteristic of the thin film transistor is substantially improved by not forming an unnecessary thin film to compensate the step of the light blocking member which may occur in the case where the color filter is disposed on the thin film transistor and the light blocking member is disposed on the periphery of the thin film transistor to efficiently repair the thin film transistor.

In such an embodiment, the overlapping portion of the first light blocking member and the second light blocking member serve as the spacer, and the manufacturing process is substantially simplified without a process for providing a sub space.

Other features of the liquid crystal display described with reference to FIGS. 2, 3 and 6 to 10 may be applied to the exemplary embodiment of the liquid crystal display of FIGS. 19 to 22.

Figure 23:
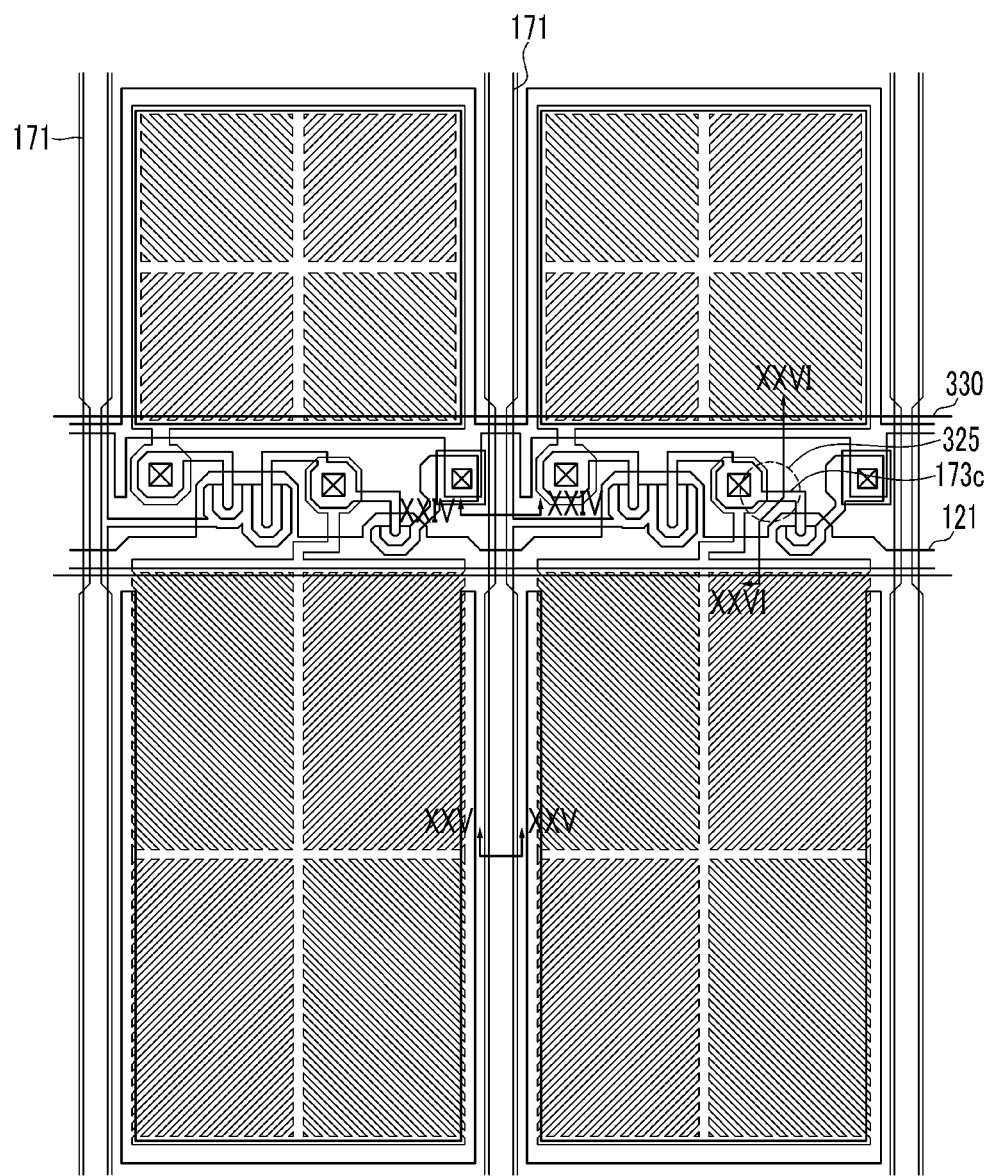
FIG. 23 is a layout view illustrating two pixels of an alternative exemplary embodiment of the liquid crystal display according to the invention.
Figure 24:
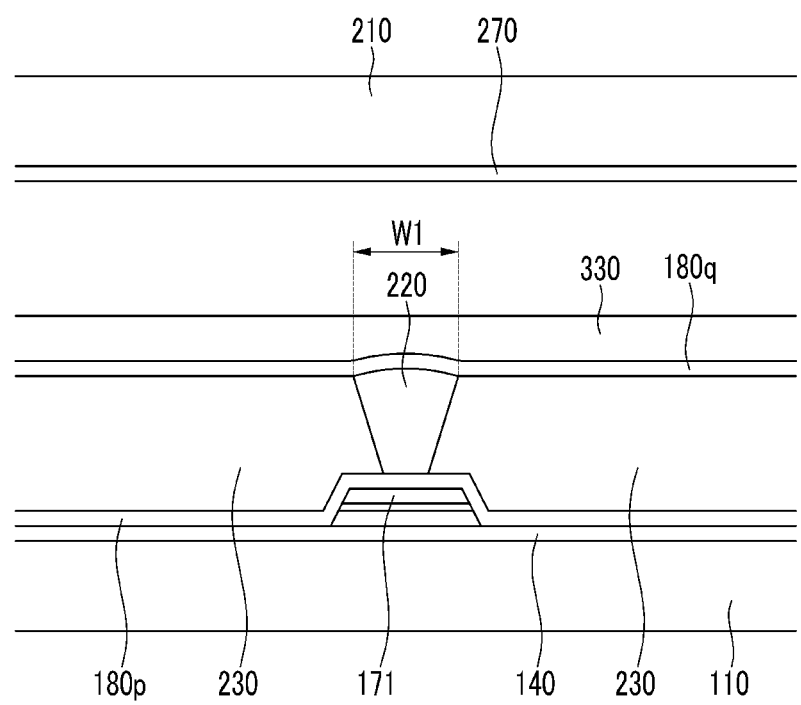
FIG. 24 is a cross-sectional view taken along line XXIV-XXIV of the liquid crystal display of FIG. 23.
Figure 25:
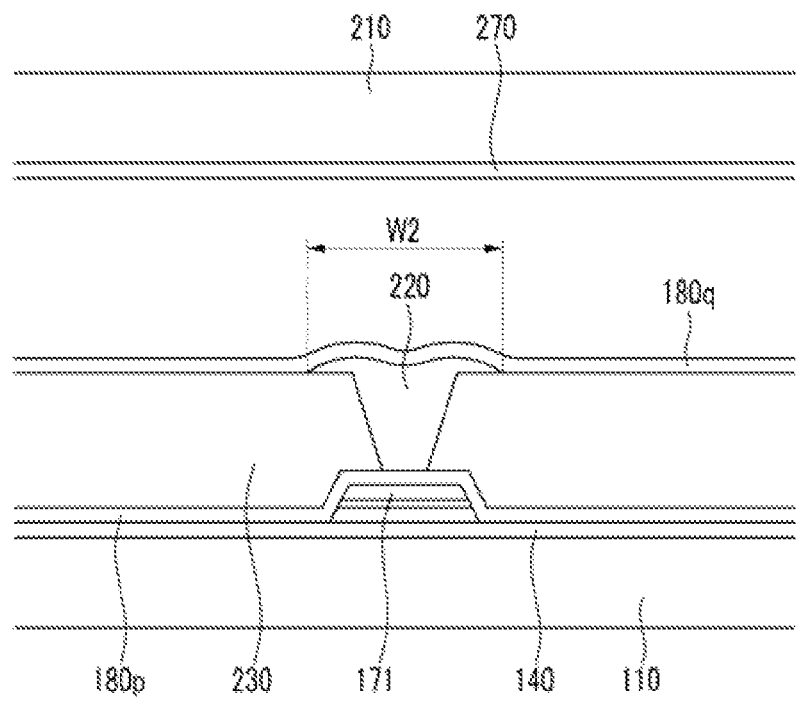
FIG. 25 is a cross-sectional view taken along line XXV-XXV of the liquid crystal display of FIG. 23.
Figure 26:
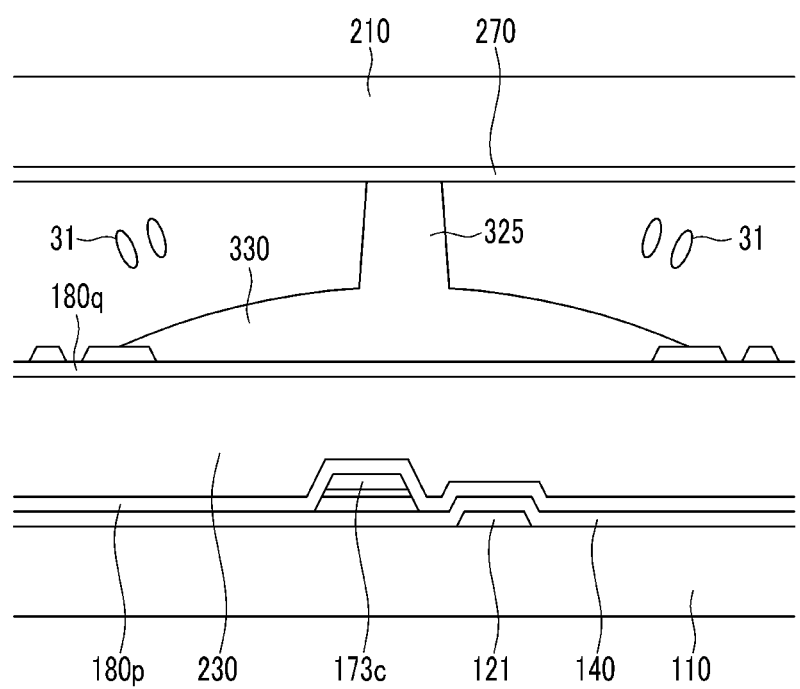
FIG. 26 is a cross-sectional view taken along line XXVI-XXVI of the liquid crystal display of FIG. 23.

Then, another alternative exemplary embodiment of a liquid crystal display according to the invention will be described with reference to FIGS. 23 to 26. FIG. 23 is a top plan view illustrating two pixels of another alternative exemplary embodiment of the liquid crystal display according to the invention. FIG. 24 is a cross-sectional view taken along line XXIV-XXIV of the liquid crystal display of FIG. 23. FIG. 25 is a cross-sectional view taken along line XXV-XXV of the liquid crystal display of FIG. 23. FIG. 26 is a cross-sectional view taken along line XXVI-XXVI of the liquid crystal display of FIG. 23.

The liquid crystal display of FIGS. 23 to 26 is substantially the same as the liquid crystal display shown in FIGS. 2, 3 and 6 to 10 except for the first light blocking member 220. The same or like elements shown in FIGS. 23 to 26 have been labeled with the same reference characters as used above to describe the exemplary embodiments of the liquid crystal display shown in FIGS. 2, 3 and 6 to 10, and any repetitive detailed description thereof will hereinafter be omitted or simplified.

In an exemplary embodiment, as shown in FIGS. 23 to 26, a width of the first light blocking member 220 of the liquid crystal display has a first width W1 in an overlapping region, at which the first light blocking member 220 overlaps the second light blocking member 330, and the first light blocking member 220 has a second width W2 in the other regions thereof. In such an embodiment, the first width W1 is less than the second width W2. In one exemplary embodiment, for example, the second width W2 of the first light blocking member 220 may be about 7 μm, and the first width W1 may be greater than the width of the data line 171.

In such an embodiment, the height of an upper surface of the first light blocking member 220 at the overlapping portion of the first light blocking member 220 and the second light blocking member 330 on the data line 171 may be reduced by decreasing the width of the first light blocking member 220 at the overlapping portion of the first light blocking member 220 and the second light blocking member 330. In one exemplary embodiment, for example, a step between the overlapping portion of the first light blocking member 220 and the second light blocking member 330 and the peripheral area may be about 0.8 μm or less.

In such an embodiment, the step between the peripheral area and the overlapping portion 324 of the first light blocking member 220 and the second light blocking member 330 is decreased by decreasing the height of the upper surface of the overlapping portion 324 of the first light blocking member 220 and the second light blocking member 330 such that irregular movement of the liquid crystal molecules, which may occur in the overlapping portion 324 of the first light blocking member 220 and the second light blocking member 330, is substantially reduced, and light leakage due to the irregular movement of the liquid crystal molecules is thereby effectively prevented.

In such an embodiment, as shown in FIG. 25, in the first light blocking member 220, a width of the first light blocking member 220 which is not overlapping the second light blocking member 330 is greater than the width of the data line 171 such that the first light blocking member 220 effectively prevents the light incident from the outside from being reflected onto the surface of the data line 171 including metal. Accordingly, the light is effectively prevented from being reflected onto the surface of the data line 171, which interferes with the light passing through the liquid crystal layer 3, and a contrast ratio of the liquid crystal display is thereby effectively prevented from deteriorating.

In an exemplary embodiment, as shown in FIGS. 23 to 26, the second passivation layer 180q may be a single layer, but not being limited thereto. In an alternative exemplary embodiment of the liquid crystal display according to the invention, the second passivation layer 180q includes a lower layer and an upper layer. In such an embodiment, the lower layer of the second passivation layer 180q may include an organic insulating layer, and the upper layer of the second passivation layer 180q may include an inorganic insulating layer such as silicon nitride or silicon oxide. In an alternative exemplary embodiment, the lower layer of the second passivation layer 180q may include an inorganic insulating layer, and the upper layer of the second passivation layer 180q may include an organic insulating layer.

In another alternative exemplary embodiment of the invention, the second passivation layer 180q may be omitted. In one exemplary embodiment, for example, the second passivation layer 180q may also be omitted only at the overlapping portion of the first light blocking member 220 and the second light blocking member 330.

Other features of the liquid crystal display described with reference to FIGS. 2, 3 and 6 to 10 may be applied to the exemplary embodiment of the liquid crystal display of FIGS. 23 to 26.

Figure 27:
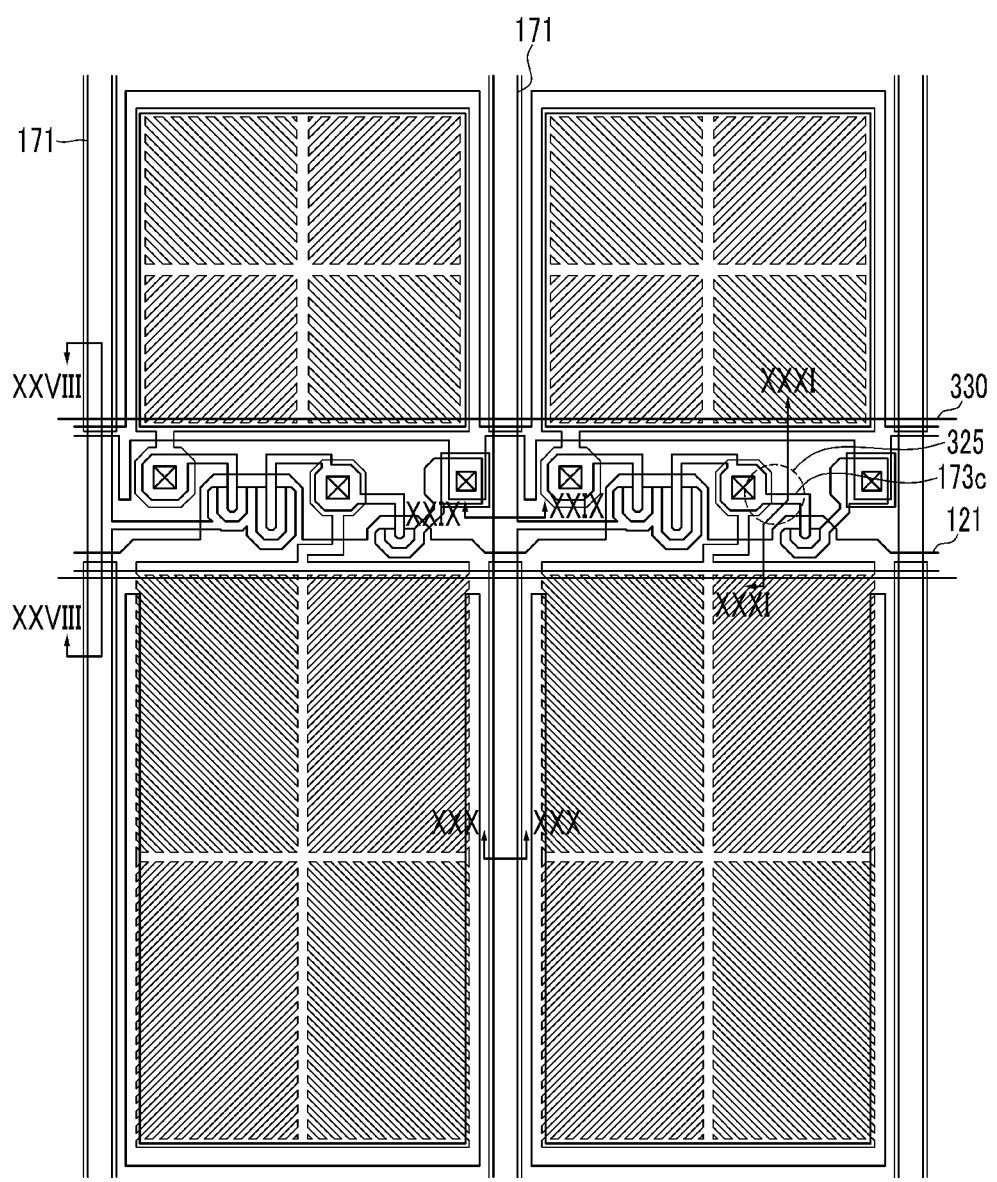
FIG. 27 is a layout view illustrating two pixels of the liquid crystal display according to another exemplary embodiment of the invention.
Figure 28:
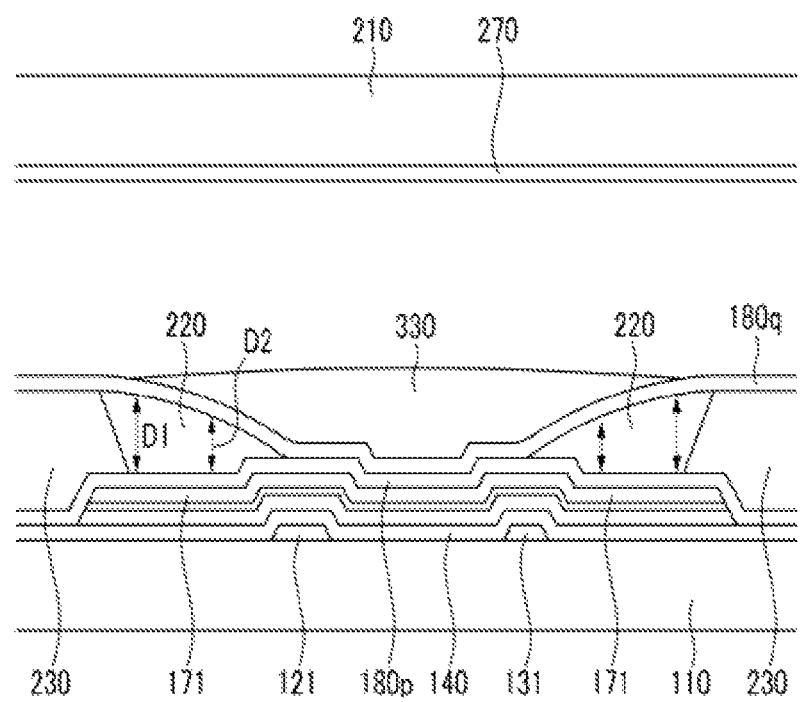
FIG. 28 is a cross-sectional view taken along line XXVIII-XXVIII of the liquid crystal display of FIG. 27.
Figure 29:
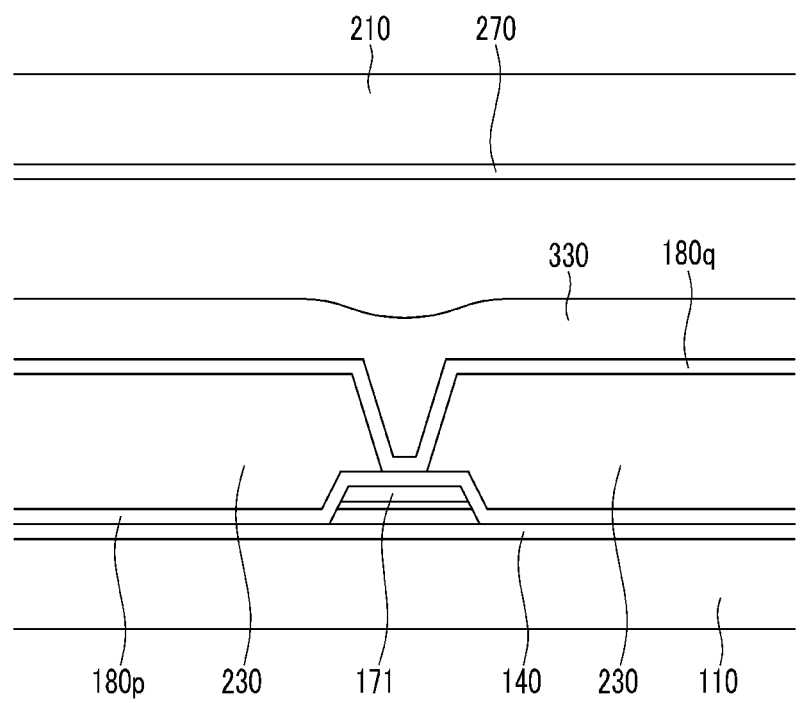
FIG. 29 is a cross-sectional view taken along line XXIX-XXIX of the liquid crystal display of FIG. 27.
Figure 30:
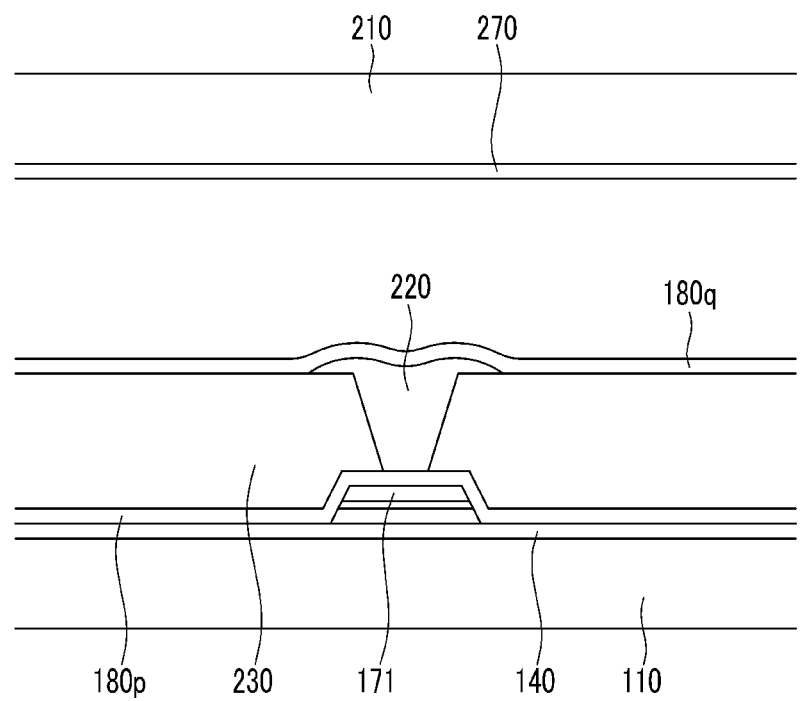
FIG. 30 is a cross-sectional view taken along line XXX-XXX of the liquid crystal display of FIG. 27.
Figure 31:
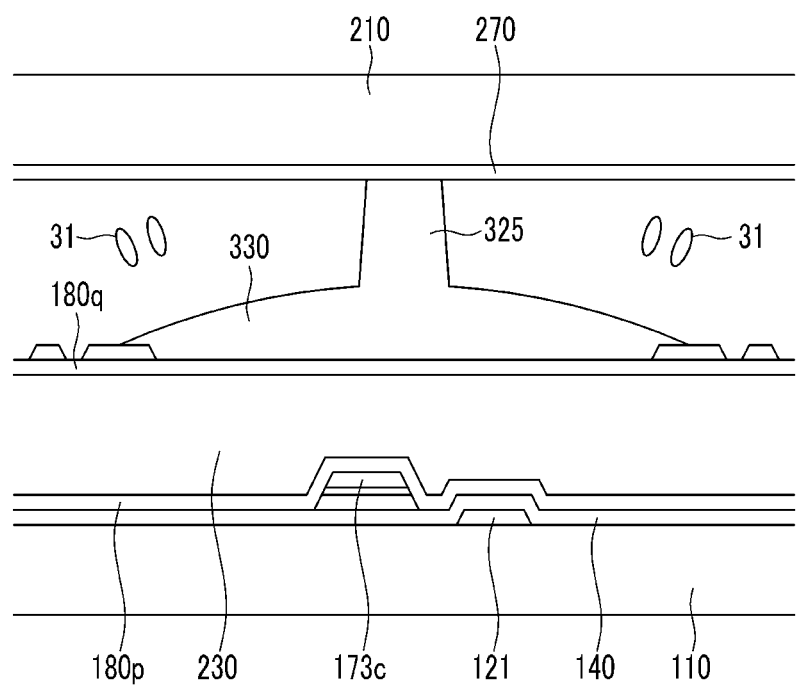
FIG. 31 is a cross-sectional view taken along line XXXI-XXXI of the liquid crystal display of FIG. 27.

Hereinafter, an alternative exemplary embodiment of a liquid crystal display according to the invention will be described with reference to FIGS. 27 to 31. FIG. 27 is a top plan view illustrating two pixels of another alternative exemplary embodiment of a liquid crystal display according to the invention. FIG. 28 is a cross-sectional view taken along line XXVIII-XXVIII of the liquid crystal display of FIG. 27. FIG. 29 is a cross-sectional view taken along line XXIX-XXIX of the liquid crystal display of FIG. 27. FIG. 30 is a cross-sectional view taken along line XXX-XXX of the liquid crystal display of FIG. 27. FIG. 31 is a cross-sectional view taken along line XXXI-XXXI of the liquid crystal display of FIG. 27.

The liquid crystal display of FIGS. 27 to 31 is substantially the same as the liquid crystal display shown in FIGS. 2, 3, and 6 to 10 and the liquid crystal display shown in FIGS. 23 to 26 except for the first light blocking member 220. The same or like elements shown in FIGS. 27 to 31 have been labeled with the same reference characters as used above to describe the exemplary embodiments of the liquid crystal display shown in FIGS. 2, 3 and 6 to 10, and any repetitive detailed description thereof will hereinafter be omitted or simplified.

In an exemplary embodiment of the liquid crystal display, as shown in FIGS. 27 to 31, the first light blocking member 220 is partially removed at the overlapping portion of the second light blocking member 330 and the data line 171. In an exemplary embodiment, a height of the first light blocking member 220 at the overlapping portion is decreased as being closer to a center of the second light blocking member 330. In such an embodiment, the height of the first light blocking member 220 has a first thickness D1 at the portion which is not overlapping the second light blocking member 330 and may have a second thickness D2 at the portion which is overlapping the second light blocking member 330. The first thickness D1 is greater than the second thickness D2. In an exemplary embodiment, the first light blocking member 220 is substantially removed at the horizontal center of the overlapping portion of the second light blocking member 330 and the data line 171. In one exemplary embodiment, for example, the height of the first light blocking member 220 may be about zero (0) at the center of the overlapping portion of the second light blocking member 330 and the data line 171.

In such an embodiment, the first light blocking member 220 is partially removed at the overlapping portion of the second light blocking member 330 and the data line 171, and a thickness of an end of the first light blocking member 220 is gradually decreased to reduce a step difference due to the overlapping of the first light blocking member 220 and the second light blocking member 330 on the data line 171 such that irregular movement of the liquid crystal molecules, which may occur in the overlapping portion 324 of the first light blocking member 220 and the second light blocking member 330, is effectively prevented, and light leakage due to the irregular movement of the liquid crystal molecules is thereby effectively prevented. In an exemplary embodiment, a step between the overlapping portion of the first light blocking member 220 and the second light blocking member 330 and the peripheral area may be about 0.8 μm or less.

In such an embodiment, as shown in FIG. 30, the width of the first light blocking member 220 may be greater than the width of the data line 171 such that the first light blocking member 220 may effectively prevent the light incident from the outside from being reflected onto the surface of the data line 171 including metal. In such an embodiment, a contrast ratio of the liquid crystal display is effectively prevented from deteriorating by the light that is reflected onto the surface of the data line 171 and interferes with the light passing through the liquid crystal layer 3.

In the exemplary embodiment illustrated in FIGS. 27 to 31, the second passivation layer 180q is illustrated as a single layer, but not being limited thereto. In an alternative exemplary embodiment, the second passivation layer 180q includes a lower layer and an upper layer. In such an embodiment, the lower layer of the second passivation layer 180q may include an organic insulating layer, and the upper layer of the second passivation layer 180q may include an inorganic insulating layer such as silicon nitride or silicon oxide, for example. In an alternative exemplary embodiment, the lower layer of the second passivation layer 180q may include an inorganic insulating layer, and the upper layer of the second passivation layer 180q may include an organic insulating layer.

In an alternative exemplary embodiment, the second passivation layer 180q may be omitted. In such an embodiment, the second passivation layer 180q may be omitted only at the overlapping portion of the first light blocking member 220 and the second light blocking member 330.

As described above, an exemplary embodiment of the liquid crystal display according to the invention includes the color filter 230 disposed between the two adjacent data lines 171, the first light blocking member 220 disposed along the data line 171, and the second light blocking member 330 disposed on the color filter 220 covering the thin film transistors, and the first light blocking member 220 and the second light blocking member 330 are overlapping each other. Accordingly, light leakage in the region adjacent to the data line and the gate line is effectively prevented while the light leakage due to the arrangement error is effectively prevented by providing the color filter and the light blocking member on the thin film transistor array panel, e.g., the lower panel 100, and a performance characteristic of the thin film transistor is substantially improved by not forming an unnecessary thin film to compensate the step of the light blocking member which may occur in the case where the color filter is disposed on the thin film transistor and the light blocking member is disposed on the periphery of the thin film transistor to efficiently repair the thin film transistor.

In such an embodiment, the overlapping portion of the first light blocking member and the second light blocking member serve as the spacer, and the manufacturing process is substantially simplified without a process for providing a sub spacer.

Further, a step difference at the periphery due to the overlapping of the first light blocking member and the second light blocking member is reduced such that irregular movement of the liquid crystal molecules, which may occur in the overlapping portion of the first light blocking member and the second light blocking member, is effectively prevented, and light leakage due to the irregular movement of the liquid crystal molecules is thereby effectively prevented.

In the illustrated exemplary embodiments described above, the third switching element Qc connected to the second liquid crystal capacitor Clcb and the divided reference voltage line RL is included to differentiate the voltage charged in the first liquid crystal capacitor Clca and the voltage charged in the second liquid crystal capacitor Clcb, but being limited thereto. In an alternative exemplary embodiment of the invention, the second liquid crystal capacitor Clcb may be connected to a step-down capacitor. In such an embodiment, the third switching element including a first terminal connected to a step-down gate line, a second terminal connected to the second liquid crystal capacitor Clcb and a third terminal connected to the step-down capacitor is included to charge some of charges charged in the second liquid crystal capacitor Clcb in the step-down capacitor, such that the charged voltages between the first liquid crystal capacitor Clcb and the second liquid crystal capacitor Clcb may be differently set. In another alternative exemplary embodiment, the first liquid crystal capacitor Clcb and the second liquid crystal capacitor Clcb are connected to different data lines, respectively, to receive different data voltages such that the charged voltages between the first liquid crystal capacitor Clcb and the second liquid crystal capacitor Clcb may be differently set. In an exemplary embodiment, the charged voltages between the first liquid crystal capacitor Clcb and the second liquid crystal capacitor Clcb may be differently set by various different methods.

Figure 32:
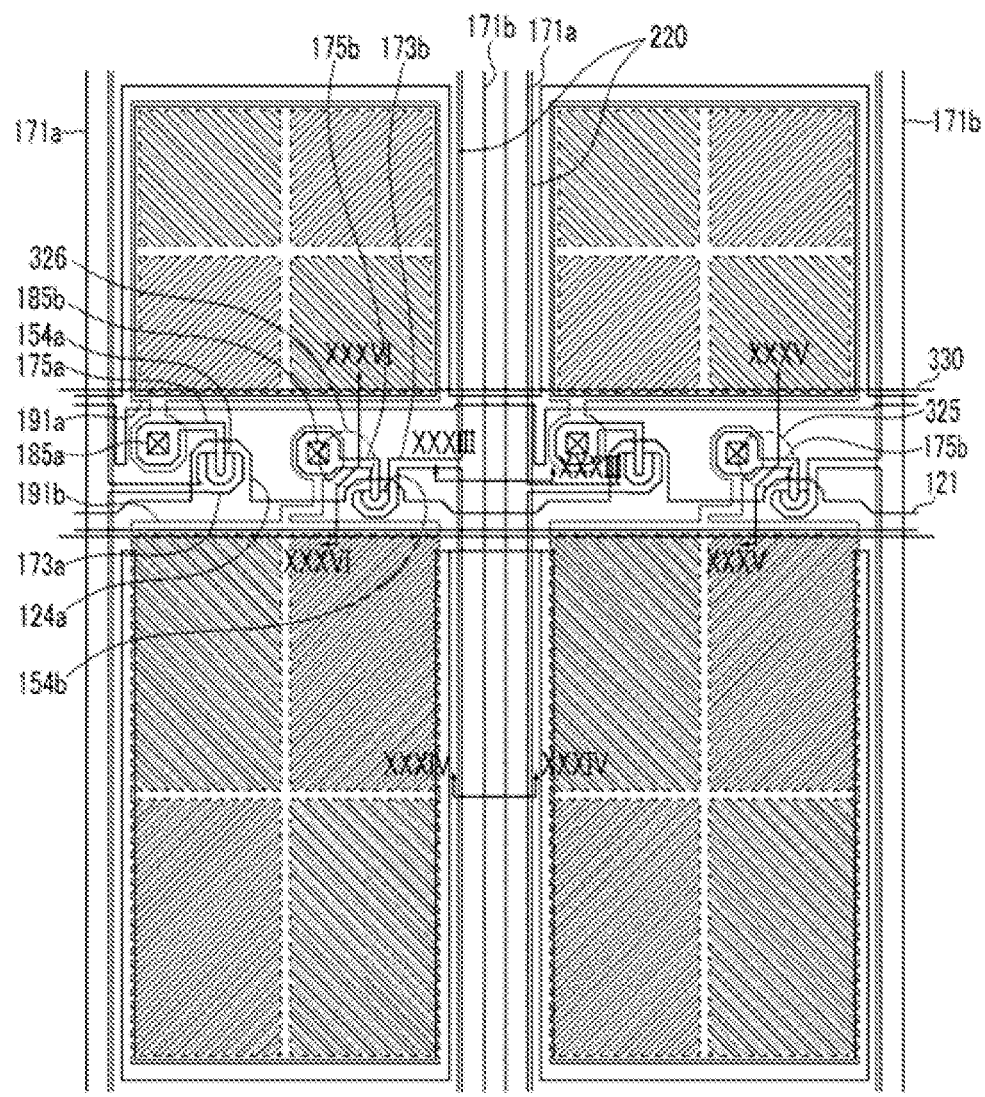
FIG. 32 is a top plan view of two pixels of another alternative exemplary embodiment of the liquid crystal display according to the invention.
Figure 33:
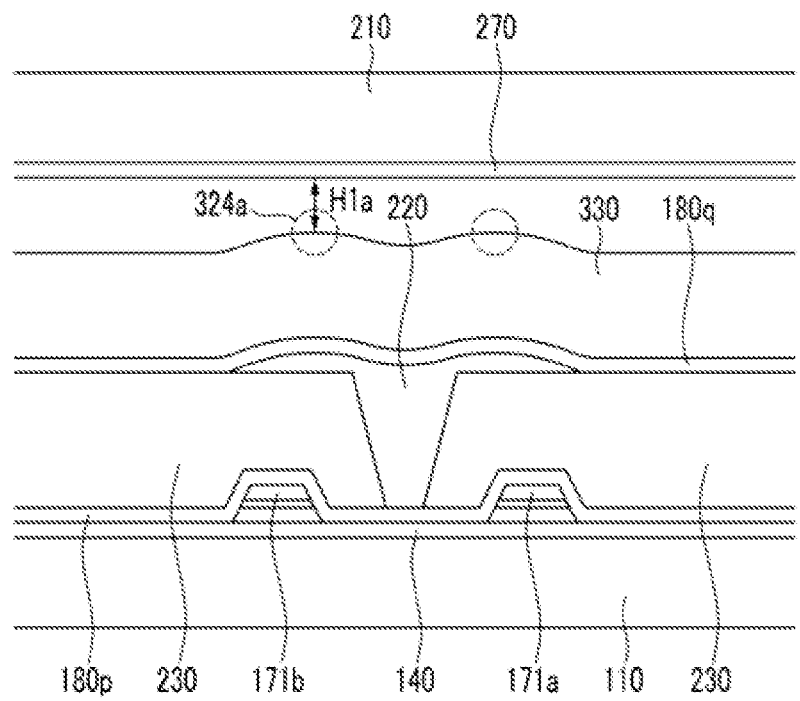
FIG. 33 is a cross-sectional view taken along line XXXIII-XXXIII of the liquid crystal display of FIG. 32.
Figure 34:
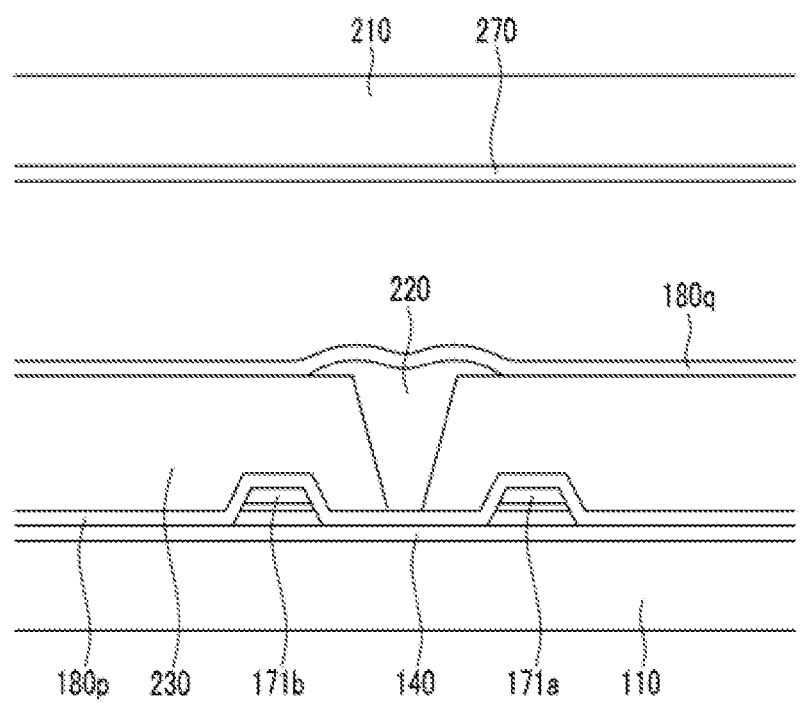
FIG. 34 is a cross-sectional view taken along line XXXIV-XXXIV of the liquid crystal display of FIG. 32.
Figure 35:
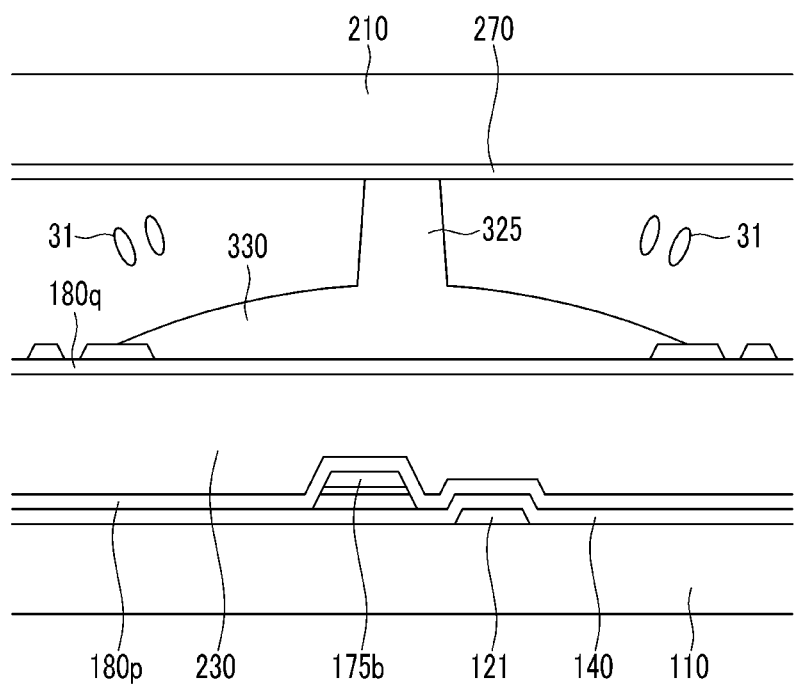
FIG. 35 is a cross-sectional view taken along line XXXV-XXXV of the liquid crystal display of FIG. 32.
Figure 36:
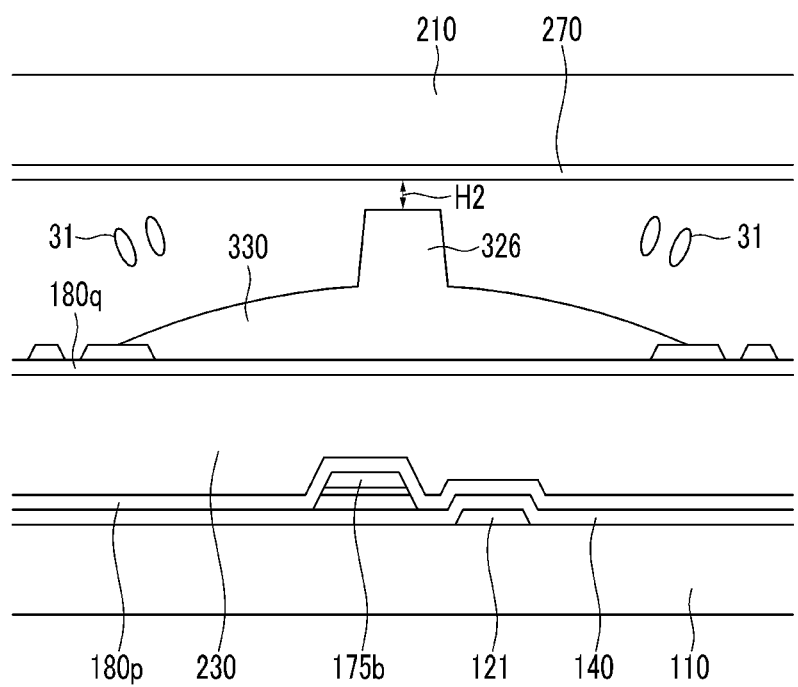
FIG. 36 is a cross-sectional view taken along line XXXVI-XXXVI of the liquid crystal display of FIG. 32.

Then, another alternative exemplary embodiment of a liquid crystal display according to the invention liquid crystal display will be described with reference to FIGS. 32 to 36. FIG. 32 is a top plan view of two pixels of another alternative exemplary embodiment of the liquid crystal display according to the invention. FIG. 33 is a cross-sectional view taken along line XXXIII-XXXIII of the liquid crystal display of FIG. 32. FIG. 34 is a cross-sectional view taken along line XXXIV-XXXIV of the liquid crystal display of FIG. 32. FIG. 35 is a cross-sectional view taken along line XXXV-XXXV of the liquid crystal display of FIG. 32. FIG. 36 is a cross-sectional view taken along line XXXVI-XXXVI of the liquid crystal display of FIG. 32.

The liquid crystal display of FIGS. 32 to 36 is substantially the same as the liquid crystal display shown in FIGS. 6 to 10 except the data lines. The same or like elements shown in FIGS. 32 to 36 have been labeled with the same reference characters as used above to describe the exemplary embodiments of the liquid crystal display shown in FIGS. 6 to 10, and any repetitive detailed description thereof will hereinafter be omitted or simplified.

In an exemplary embodiment, as shown in FIG. 32, two data lines including a first data line 171a and a second data line 171b are positioned between two pixels. The first data line 171a is positioned at a left side of a pixel, and the second data line 171b is positioned at a right side of the pixel. The first subpixel electrode 191a of each pixel receives data voltage from the first source electrode 173a connected to the first data line 171a and receives data voltage from the second source electrode 173b connected to the second data line 171b.

In an exemplary embodiment, the first thin film transistor, which is defined by the first gate electrode 124a extending from the gate line 121, the first semiconductor 154a, the first source electrode 173a connected to the first data line 171a, and the first drain electrode 175a, is connected to the first subpixel electrode 191a, and the second thin film transistor, which is defined by the second gate electrode 124b extending from the gate line 121, the second semiconductor 154b, the second source electrode 173b connected to the second data line 171b, and the second drain electrode 175b, is connected to the second subpixel electrode 191b. The first subpixel electrode 191a is connected to the first drain electrode 175a through the first contact hole 185a to receive the data voltage from the first drain electrode 175a, and the second subpixel electrode 191b is connected to the second drain electrode 175b through the second contact hole 185b to receive the data voltage from the second drain electrode 175b.

Referring to FIGS. 32 and 33, the first light blocking member 220 is positioned between two color filters 230 positioned at two pixels, and positioned to cover the first data line 171a and the second data line 171b positioned between the two pixels. A height of the overlapping portion of the first light blocking member 220 and the second light blocking member 330 positioned on the first data line 171a and the second data line 171b is greater than a height of the second light blocking member 330 positioned at other portions. Accordingly, the first data line 171a and the second data line 171b, and a first overlapping portion 324a of the first light blocking member 220 and the second light blocking member 330 may be spaced apart from the upper panel 200 opposed thereto by a third distance H1a.

In such an embodiment, similarly to the exemplary embodiments described above, the second light blocking member 330 of the liquid crystal display extends in a horizontal direction in a region where the thin film transistor connected to the first subpixel electrode 191a and the second subpixel electrode 191b, and the first and second contact holes 185a and 185b are positioned.

Referring to FIG. 35, the second light blocking member 330 includes a first spacer part 325 in the middle area thereof and having a greater thickness than the other area thereof. The first spacer part 325 is disposed to contact the upper panel 200. The second light blocking member 330 and the first spacer part 325 are disposed on a same layer such that the manufacturing process is simplified, and light leakage, which may occur around the first spacer part 325, may be effectively prevented.

Referring to FIG. 36, the second light blocking member 330 may include a second spacer part 326. The second spacer part 326 is thicker than the second light blocking member 330 in the other area, but may be thinner than the first spacer part 325. The second spacer part 326 may be spaced apart from the upper panel 200 opposed thereto by a second distance H2. The second spacer part 326 may serve to additionally maintain a cell gap when pressure or the like is applied from the outside.

In an alternative exemplary embodiment, the second spacer part 326 of the second light blocking member 330 may be omitted. In such an embodiment, where the second light blocking member 330 does not include the second spacer part 326, the second light blocking member 330 may have two portions having different thicknesses by the first spacer part 325 and the other area thereof such that the step may be efficiently controlled and thus accuracy in the process is improved and manufacturing costs are reduced, as compared with the embodiment where the second light blocking member 330 has three portions having different thicknesses by the first spacer part 325 and the second spacer part 326.

In an exemplary embodiment, the first spacer part 325 and the second spacer part 326 described above may not be provided in all of the pixel areas, but may be provided only in a portion of the plurality of pixel areas.

In an exemplary embodiment, as shown in FIG. 34, the first light blocking member 220 is disposed to cover both the first data line 171a and the second data line 171b, which are adjacent to each other to be positioned between two pixels, such that the first light blocking member 220 effectively prevents the light incident from the outside from being reflected onto the surface of the data line 171 including metal. Accordingly, a contrast ratio of the liquid crystal display is effectively prevented from deteriorating by the light that is reflected onto the surface of the data line 171 and interferes with the light passing through the liquid crystal layer 3.

In an exemplary embodiment, the width or the height of the first light blocking member 220 may be constant. In an alternative exemplary embodiment, similarly to the exemplary embodiment described with reference to FIGS. 23 to 26, the width of the first light blocking member 220 may vary according to position, e.g., the width of the first light blocking member 220 in the remaining region may be greater than the width of the first light blocking member 220 in the region overlapping the second light blocking member 330. In another alternative exemplary embodiment of the invention, similarly to the exemplary embodiment described with reference to FIGS. 27 to 31, the first light blocking member 220 may be partially removed from the second light blocking member 330 at the overlapping portion of the first data line 171*a* and the second data line 171*b*, and the height of the first light blocking member 220 may be decreased as being closer to the center of the second light blocking member 330.

In an exemplary embodiment, as shown in FIGS. 33 to 36, the second passivation layer 180*q* may be a single layer, but not being limited thereto. In an alternative exemplary embodiment of the liquid crystal display according to the invention, the second passivation layer 180*q* may include a lower layer and an upper layer. In such an embodiment, the lower layer of the second passivation layer 180*q* may include an organic insulating layer, and the upper layer of the second passivation layer 180*q* may include an inorganic insulating layer such as silicon nitride or silicon oxide, for example. In another alternative exemplary embodiment, the lower layer of the second passivation layer 180*q* may include an inorganic insulating layer, and the upper layer of the second passivation layer 180*q* may include an organic insulating layer.

In another alternative exemplary embodiment, the second passivation layer 180*q* may be omitted, e.g., the second passivation layer 180*q* may also be omitted only at the overlapping portion of the first light blocking member 220 and the second light blocking member 330.

Other features of the liquid crystal display shown in FIGS. 2, 3 and 6 to 10, the liquid crystal display shown in FIGS. 23 to 26, and the liquid crystal display shown in FIGS. 27 to 31 may be applied to the exemplary embodiment of the liquid crystal display of FIGS. 32 to 36.

Figure 37:
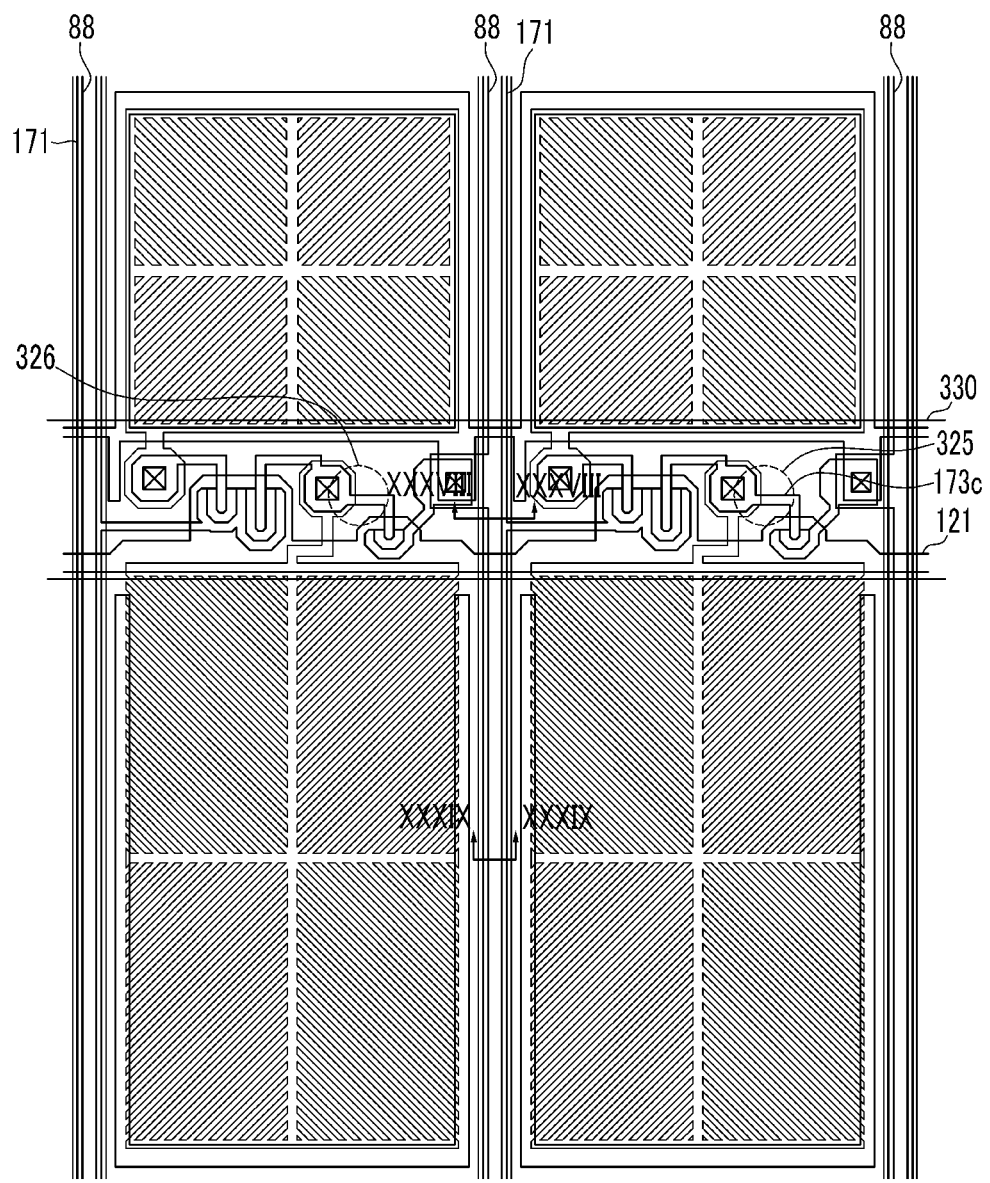
FIG. 37 is a top plan view of two pixels of another alternative exemplary embodiment of the liquid crystal display according to the invention.
Figure 38:
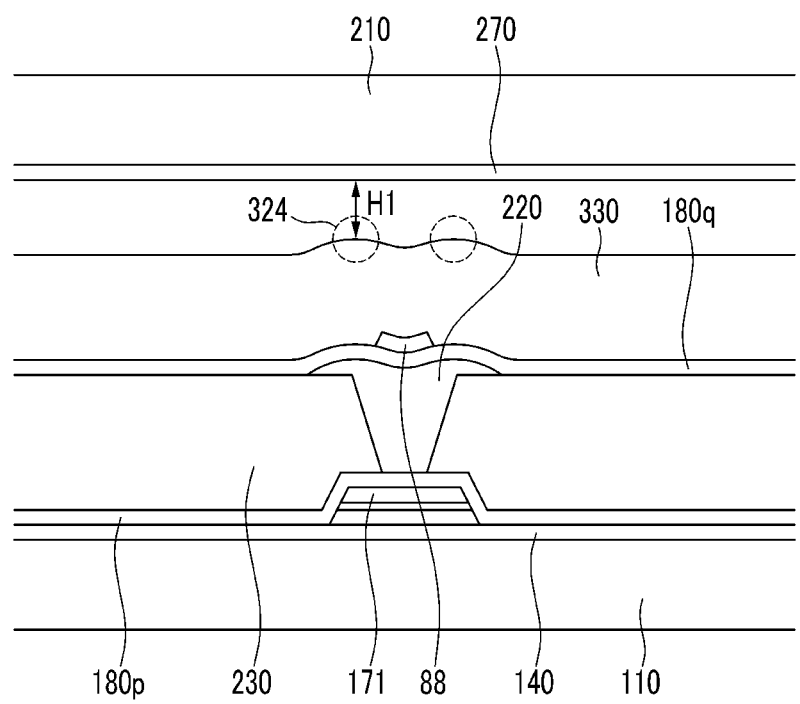
FIG. 38 is a cross-sectional view taken along line XXXVIII-XXXVIII of the liquid crystal display of FIG. 37.
Figure 39:
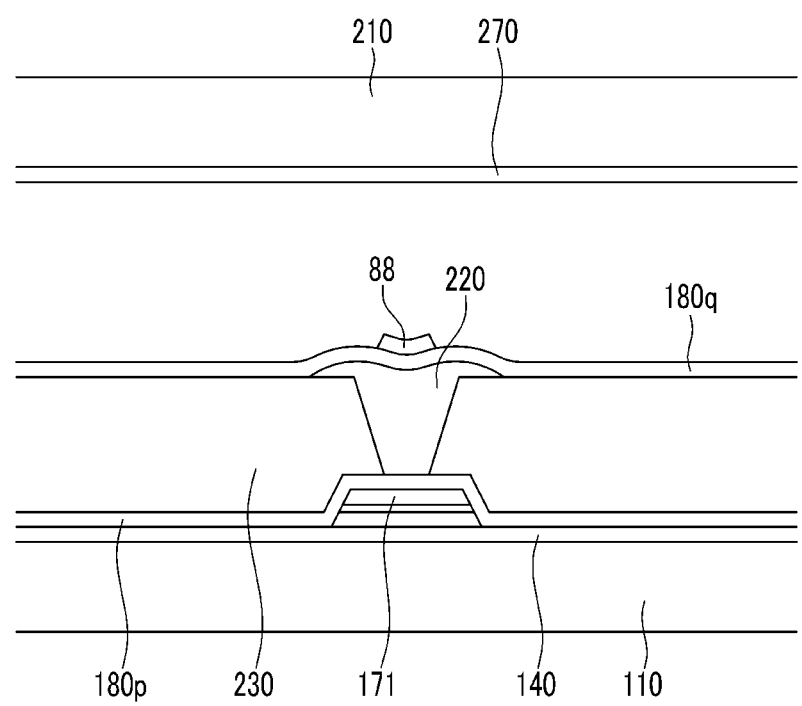
FIG. 39 is a cross-sectional view taken along line XXXIX-XXXIX of the liquid crystal display of FIG. 37.

Then, another alternative exemplary embodiment of a liquid crystal display according to the invention will be described with reference to FIGS. 37 to 39. FIG. 37 is a top plan view of two pixels of another alternative exemplary embodiment of a liquid crystal display according to the invention. FIG. 38 is a cross-sectional view taken along line XXXVIII-XXXVIII of the liquid crystal display of FIG. 37. FIG. 39 is a cross-sectional view of taken along line XXXIX-XXXIX the liquid crystal display of FIG. 37.

The liquid crystal display of FIGS. 37 to 39 is substantially the same as the liquid crystal display shown in FIGS. 6 to 10 except that a shielding electrode. The same or like elements shown in FIGS. 37 to 39 have been labeled with the same reference characters as used above to describe the exemplary embodiments of the liquid crystal display shown in FIGS. 6 to 10, and any repetitive detailed description thereof will hereinafter be omitted or simplified.

In an exemplary embodiment, as shown in FIGS. 37 to 39, a shielding electrode 88 is disposed on the data line 171. In such an embodiment, the shielding electrode 88 may receive common voltage and interrupt electromagnetic interference between the data line 171 and the pixel electrodes 191*a* and 191*b*, and between the data line 171 and the common electrode 270 such that voltage distortion of the pixel electrodes 191*a* and 191*b* and signal delay of the data voltage transferred by the data line 171 are substantially reduced.

Referring to FIG. 38, similarly to the exemplary embodiment of the liquid crystal display shown in FIGS. 6 to 10, the height of the overlapping portion 324 of the first light blocking member 220 and the second light blocking member 330 positioned on the data line 171 is greater than the height of the second light blocking member 330 positioned at the remaining portion. Accordingly, the overlapping portion 324 of the first light blocking member 220 and the second light blocking member 330 may be spaced apart from the upper panel 200 opposed thereto by a first distance H1. When the pressure or the like is applied from the outside, the overlapping portion 324 of the first light blocking member 220 and the second light blocking member 330 may serve to additionally maintain the cell gap.

In an exemplary embodiment, the width of the first light blocking member 220 may be greater than the width of the data line 171. In such an embodiment, where the width of the first light blocking member 220 is greater than the width of the data line 171, light incident from the outside is effectively prevented from being reflected onto the surface of the data line 171 including metal, and a contrast ratio of the liquid crystal display is effectively prevented from deteriorating by the light that is reflected onto the surface of the data line 171 and interferes with the light passing through the liquid crystal layer 3.

In an exemplary embodiment of the liquid crystal display, the width or the height of the first light blocking member 220 is not substantially changed according to a position, e.g., substantially constant, but not being limited thereto. In an alternative exemplary embodiment of the invention, similarly to the exemplary embodiment described with reference to FIGS. 23 to 26, the width of the first light blocking member 220 in the remaining region may be greater than the width of the first light blocking member 220 in the region where the first light blocking member 220 overlapping the second light blocking member 330. In another alternative exemplary embodiment of the invention, similarly to the exemplary embodiment described with reference to FIGS. 27 to 31, the first light blocking member 220 may be partially removed from the second light blocking member 330 and the overlapping portion of the first data line 171*a* and the second data line 171*b*, and the height of the first light blocking member 220 may be decreased as being closer to the center of the second light blocking member 330.

In an exemplary embodiment of the liquid crystal display, as shown in FIGS. 38 and 39, the second passivation layer 180*q* may be a single layer, but not being limited thereto. In an alternative exemplary embodiment of the liquid crystal display according to the invention, the second passivation layer 180*q* includes a lower layer and an upper layer. In such an embodiment, the lower layer of the second passivation layer 180*q* may include an organic insulating layer, and the upper layer of the second passivation layer 180*q* may include an inorganic insulating layer such as silicon nitride or silicon oxide, for example. In another alternative exemplary embodiment of the invention, the lower layer of the second passivation layer 180q may include an inorganic insulating layer, and the upper layer of the second passivation layer 180q may include an organic insulating layer.

In an exemplary embodiment of the liquid crystal display according to the invention, the second passivation layer 180q may be omitted. In such an embodiment, the second passivation layer 180q may be omitted only at the overlapping portion of the first light blocking member 220 and the second light blocking member 330.

Other features of the exemplary embodiment of the liquid crystal display described with reference to FIGS. 2, 3 and 6 to 10, the exemplary embodiment of the liquid crystal display described with reference to FIGS. 23 to 26, and the exemplary embodiment of the liquid crystal display described with reference to FIGS. 27 to 31 may be applied to the exemplary embodiment of the liquid crystal display of FIGS. 37 to 39.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first insulation substrate;
a gate line disposed on the first insulation substrate;
a first data line and a second data line disposed on the first insulation substrate;
a color filter disposed on the first insulation substrate and disposed between the first data line and the second data line;
a first light blocking member disposed on the first data line and the second data line; and
a second light blocking member disposed on the color filter and the first light blocking member, extending in the same direction as the gate line, and overlapping the first light blocking member on the first data line and the second data line,
wherein the first light blocking member comprises a first portion and a second portion,
the first portion overlaps the second light blocking member and the second portion dose not overlap the second light blocking member, and
a width of the first portion of the first light blocking member is less than a width of the second portion of the first light blocking member.

2. The liquid crystal display of claim 1, wherein
the width of the first light blocking member is greater than a width of the second data line.

3. The liquid crystal display of claim 1, wherein
the second light blocking member includes a first portion, a second portion and a third portion, and
thicknesses of the first, second and third portions are different from each other.

4. The liquid crystal display of claim 3, further comprising:
a pixel electrode disposed on the color filter, wherein the pixel electrode comprises a first subpixel electrode and a second subpixel electrode separated from each other with the gate line disposed between the first and second subpixel electrodes;
a first thin film transistor connected to the first subpixel electrode; and
a second thin film transistor connected to the second subpixel electrode,
wherein the second light blocking member extends along the gate line and covers the first thin film transistor and the second thin film transistor.

5. The liquid crystal display of claim 4, wherein
each of the first subpixel electrode and the second subpixel electrode comprises a plurality of stems, and a plurality of branch electrodes protruding from the stems.

6. The liquid crystal display of claim 1, further comprising:
a pixel electrode disposed on the color filter, wherein the pixel electrode comprises a first subpixel electrode and a second subpixel electrode separated from each other with the gate line disposed between the first and second subpixel electrodes;
a first thin film transistor connected to the first subpixel electrode; and
a second thin film transistor connected to the second subpixel electrode,
wherein the second light blocking member extends along the gate line and covers the first thin film transistor and the second thin film transistor.

7. The liquid crystal display of claim 6, wherein
each of the first subpixel electrode and the second subpixel electrode comprises a plurality of stems and a plurality of branch electrodes protruding from the stems.

8. The liquid crystal display of claim 1, wherein
the width of the first portion of the first light blocking member is about 0.7 micrometer.

9. A liquid crystal display, comprising:
a first insulation substrate;
a gate line disposed on the first insulation substrate;
a first data line and a second data line disposed on the first insulation substrate;
a color filter disposed on the first insulation substrate and disposed between the first data line and the second data line;
a first light blocking member disposed on the first data line and the second data line; and
a second light blocking member disposed on the color filter and the first light blocking member, extending in the same direction as the gate line, and overlapping the first light blocking member on the first data line and the second data line,
wherein a width of the first light blocking member is substantially constant,
the second light blocking member includes a first portion and a second portion, and
thicknesses of the first and second portions are different from each other.

10. The liquid crystal display of claim 9, wherein
the first portion contacts a surface of a thin film which is disposed on a second insulation substrate disposed opposite to the first insulation substrate.

11. The liquid crystal display of claim 10, wherein
the second portion includes a first region overlapping the first light blocking member and a second region including a remainder of the second portion, and
a distance between the first region and the surface of the thin film disposed on the second insulation substrate is less than a distance between the second region and the surface of the thin film disposed on the second insulation substrate.

12. The liquid crystal display of claim 11, further comprising:
a pixel electrode disposed on the color filter, wherein the pixel electrode comprises a first subpixel electrode and a second subpixel electrode separated from each other with the gate line disposed between the first and second subpixel electrodes;
a first thin film transistor connected to the first subpixel electrode; and
a second thin film transistor connected to the second subpixel electrode,
wherein the second light blocking member extends along the gate line and covers the first thin film transistor and the second thin film transistor.

13. The liquid crystal display of claim 12, wherein
each of the first subpixel electrode and the second subpixel electrode comprises a plurality of stems and a plurality of branch electrodes protruding from the stems.

14. The liquid crystal display of claim 9, wherein
the second light blocking member further includes a third portion, and
thicknesses of the first, second and third portions are different from each other.

15. The liquid crystal display of claim 14, further comprising:
a pixel electrode disposed on the color filter, wherein the pixel electrode comprises a first subpixel electrode and a second subpixel electrode separated from each other with the gate line disposed between the first and second subpixel electrodes;
a first thin film transistor connected to the first subpixel electrode; and
a second thin film transistor connected to the second subpixel electrode,
wherein the second light blocking member extends along the gate line and covers the first thin film transistor and the second thin film transistor.

16. The liquid crystal display of claim 15, wherein
each of the first subpixel electrode and the second subpixel electrode comprises a plurality of stems and a plurality of branch electrodes protruding from the stems.

17. The liquid crystal display of claim 9, further comprising:
a pixel electrode disposed on the color filter and including a first subpixel electrode and a second subpixel electrode separated from each other with the gate line disposed between the first and second subpixel electrodes;
a first thin film transistor connected to the first subpixel electrode; and
a second thin film transistor connected to the second subpixel electrode,
wherein the second light blocking member extends along the gate line and covers the first thin film transistor and the second thin film transistor.

* * * * *